US012289749B2

(12) United States Patent
Huang et al.

(10) Patent No.: US 12,289,749 B2
(45) Date of Patent: Apr. 29, 2025

(54) INTERFERENCE POWER CONTROL FOR SIDELINK COMMUNICATIONS

(71) Applicant: Qualcomm Incorporated, San Diego, CA (US)

(72) Inventors: Min Huang, Beijing (CN); Chao Wei, Beijing (CN); Hao Xu, Beijing (CN); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 17/642,875

(22) PCT Filed: Jul. 16, 2020

(86) PCT No.: PCT/CN2020/102305
§ 371 (c)(1),
(2) Date: Mar. 14, 2022

(87) PCT Pub. No.: WO2021/047285
PCT Pub. Date: Mar. 18, 2021

(65) Prior Publication Data
US 2022/0400492 A1 Dec. 15, 2022

(30) Foreign Application Priority Data
Sep. 13, 2019 (WO) ................ PCT/CN2019/105816

(51) Int. Cl.
*H04W 72/541* (2023.01)
*H04L 5/14* (2006.01)
(Continued)

(52) U.S. Cl.
CPC ....... *H04W 72/541* (2023.01); *H04W 52/243* (2013.01); *H04W 52/367* (2013.01);
(Continued)

(58) Field of Classification Search
CPC ............. H04W 72/541; H04W 52/243; H04W 52/367; H04W 72/0446; H04W 92/18;
(Continued)

(56) References Cited

U.S. PATENT DOCUMENTS 10,531,453 B2   1/2020   Chen et al.
10,841,062 B2   11/2020  Nagaraja et al.
(Continued)

FOREIGN PATENT DOCUMENTS

CN    103338452 A    10/2013
CN    103354631 A    10/2013
(Continued)

OTHER PUBLICATIONS

International Search Report and Written Opinion—PCT/CN2020/102305—ISA/EPO—Oct. 19, 2020.
(Continued)

*Primary Examiner* — Rushil P. Sampat
(74) *Attorney, Agent, or Firm* — Holland & Hart LLP

(57) ABSTRACT

Methods, systems, and devices for wireless communications are described. Generally, the described techniques provide for a first transmission from a first device to be received at a second device. The second device may determine one or more interference parameters (e.g., a maximum allowable interference power) for receiving the first transmission from the first device, and the second device may transmit an indication of the one or more interference parameters using a full-duplex operation (e.g., using resources overlapping with resources used to receive the first transmission). The third device may receive the indication of the one or more interference parameters and determine transmission parameters (e.g., a maximum transmit power) for communicating with a fourth device based on the one or more interference parameters. The third device may transmit a second trans- (Continued)

mission to the fourth device based on the transmission parameters.

52 Claims, 10 Drawing Sheets

(51) Int. Cl.
*H04W 52/24* (2009.01)
*H04W 52/36* (2009.01)
*H04W 72/0446* (2023.01)
*H04W 92/18* (2009.01)

(52) U.S. Cl.
CPC ........... *H04W 72/0446* (2013.01); *H04L 5/14* (2013.01); *H04W 92/18* (2013.01)

(58) Field of Classification Search
CPC ..... H04W 8/005; H04W 48/16; H04W 72/23; H04L 5/14; H04L 5/0048; H04L 5/005
See application file for complete search history.

(56) References Cited

U.S. PATENT DOCUMENTS

| | | | |
|---|---|---|---|
| 2016/0037530 | A1 | 2/2016 | Peng et al. |
| 2016/0044486 | A1 | 2/2016 | Pais et al. |
| 2016/0135211 | A1 | 5/2016 | Panigrahi et al. |
| 2017/0078863 | A1* | 3/2017 | Kim ................... H04L 5/005 |
| 2018/0102807 | A1 | 4/2018 | Chen et al. |
| 2018/0146491 | A1* | 5/2018 | Kim ................... H04W 24/10 |
| 2018/0176891 | A1* | 6/2018 | Kim ................... H04L 5/0037 |
| 2019/0082444 | A1* | 3/2019 | Chen ................... H04W 4/46 |
| 2019/0165830 | A1 | 5/2019 | Bienas et al. |
| 2019/0342910 | A1* | 11/2019 | Cao ................... H04L 5/0091 |
| 2021/0392707 | A1* | 12/2021 | Do ................... H04W 72/02 |
| 2024/0357641 | A1* | 10/2024 | Sun ................... H04W 72/046 |

FOREIGN PATENT DOCUMENTS

| | | |
|---|---|---|
| CN | 103634892 A | 3/2014 |
| CN | 104105217 A | 10/2014 |
| WO | WO-2013107004 A1 | 7/2013 |
| WO | WO-2015020384 A1 | 2/2015 |
| WO | WO-2018145007 | 8/2018 |
| WO | WO-2018204203 | 11/2018 |
| WO | WO-2019069227 A1 | 4/2019 |

OTHER PUBLICATIONS

International Search Report and Written Opinion—PCT/CN2019/105816—ISA/EPO—Apr. 24, 2020.
CATT: "Discussion on Coexistence of NR V2X and LTE V2X", 3GPP TSG RAN WG1 Meeting #96, R1-1901999, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 8 Pages, XP051599694, The whole document.
Hussein H., et al., "Intensive Benchmarking of D2D Communication over 5G Cellular Networks: Prototype, Integrated Features, Challenges, and Main Applications", Wireless Networks, ACM, 2 Penn Plaza, Suite 701—New York, USA, vol. 26, No. 5, Sep. 9, 2019, pp. 3183-3202, XP037128219, ISSN: 1022-0038, DOI: 10.1007/S11276-019-02131-2, The whole document.
Supplementary European Search Report—EP20863909—Search Authority—Munich—Jul. 31, 2023.

* cited by examiner

INTERFERENCE POWER CONTROL FOR SIDELINK COMMUNICATIONS

CROSS REFERENCE TO RELATED APPLICATIONS

The present Application is a 371 national stage filing of International PCT Application No. PCT/CN2020/102305 by Huang et al., entitled "INTERFERENCE POWER CONTROL FOR FULL-DUPLEX SIDELINK COMMUNICATIONS," filed Jul. 16, 2020; and claims priority to International PCT Application No. PCT/CN2019/105816 by Huang et al., entitled "INTERFERENCE POWER CONTROL FOR SIDELINK COMMUNICATIONS," filed Sep. 13, 2019, each of which is assigned to the assignee hereof, and each of which is expressly incorporated by reference in its entirety herein.

BACKGROUND

The following relates to wireless communications, including interference power control for sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may be capable of transmitting traffic to another UE while receiving traffic from a third UE, simultaneously using time and frequency resources that are at least partially overlapping. This capability to communicate in two directions using at least partially overlapping time-frequency resources may be referred to as a full-duplex capability. In some cases, however, a UE may be prevented from detecting transmissions from another UE that may cause interference at respective receiving UEs. Efficient techniques for managing such interference may be desired to help enhance system performance and reliability.

SUMMARY

The described techniques relate to improved methods, systems, devices, and apparatuses that support interference power control for sidelink communications. Generally, the described techniques provide for a user equipment (UE) receiving a first transmission from a first device (e.g., another UE) using a first set of wireless resources (e.g., time-frequency resources). In some cases, the UE may determine one or more interference parameters for receiving the first transmission from the first device, where the one or more interference parameters may be associated with a second transmission from a third device (e.g., a third UE) to a fourth device (e.g., a fourth UE) using a second set of wireless resources. The one interference parameters may include, for example, one or more of a maximum allowable interference power, an interference power adjustment, or resources (e.g., time-domain resources) that the UE may use to receive the first transmissions from the first device.

The UE may transmit (e.g., broadcast) an indication of the determined interference parameters, (e.g., while receiving transmissions from the first device), which may include a full-duplex operation using a third set of wireless resources that overlaps at least partially in the time domain with the first set of wireless resources. The third device, that is, the third UE, may receive the indication of the one or more interference parameters using the third set of wireless resources. The third UE may determine transmission parameters for communicating with the fourth device based on the one or more received interference parameters. For example, the third UE may determine a maximum transmit power for transmitting the second transmission to the fourth device according to the received interference parameters. Based on the transmission parameters, the third UE may transmit the second transmission to the fourth device.

A method of wireless communication is described. The method may include receiving a first transmission from a first device at a second device using a first set of wireless resources, determining one or more interference parameters for receiving the first transmission from the first device, the one or more interference parameters associated with a second transmission from a third device to a fourth device using a second set of wireless resources, and transmitting an indication of the one or more interference parameters using a third set of wireless resources.

An apparatus for wireless communication is described. The apparatus may include a processor, memory coupled with the processor, and instructions stored in the memory. The instructions may be executable by the processor to cause the apparatus to receive a first transmission from a first device at a second device using a first set of wireless resources, determine one or more interference parameters for receiving the first transmission from the first device, the one or more interference parameters associated with a second transmission from a third device to a fourth device using a second set of wireless resources, and transmit an indication of the one or more interference parameters using a third set of wireless resources.

Another apparatus for wireless communication is described. The apparatus may include means for receiving a first transmission from a first device at a second device using a first set of wireless resources, determining one or more interference parameters for receiving the first transmission from the first device, the one or more interference parameters associated with a second transmission from a third device to a fourth device using a second set of wireless resources, and transmitting an indication of the one or more interference parameters using a third set of wireless resources.

A non-transitory computer-readable medium storing code for wireless communication is described. The code may include instructions executable by a processor to receive a first transmission from a first device at a second device using a first set of wireless resources, determine one or more interference parameters for receiving the first transmission from the first device, the one or more interference parameters associated with a second transmission from a third device to a fourth device using a second set of wireless resources, and transmit an indication of the one or more interference parameters using a third set of wireless resources.

In some examples of the method, apparatuses, and non-transitory computer-readable medium described herein, transmitting the indication of the one or more interference parameters may include operations, features, means, or instructions for transmitting the indication in a full-duplex operation using the third set of wireless resources that overlaps at least partially in the time domain with the first set of wireless resources.

Some examples of the method, apparatuses, and non-transitory computer-readable medium described herein may further include operations, features, means, or instructions for broadcasting the indication of the one or more interference parameters.

In some examples of the method, apparatuses, and non-transitory computer-readable medium described herein, transmitting the indication of the one or more interference parameters may include operations, features, means, or instructions for transmitting the indication of the one or more interference parameters to the third device, and the second set of wireless resources may at least partially overlap the first set of wireless resources.

In some examples of the method, apparatuses, and non-transitory computer-readable medium described herein, transmitting the indication of the one or more interference parameters may include operations, features, means, or instructions for periodically transmitting the indication of the one or more interference parameters in a set of transmission time intervals.

In some examples of the method, apparatuses, and non-transitory computer-readable medium described herein, transmitting the indication of the one or more interference parameters may include operations, features, means, or instructions for transmitting one or more reference signals (e.g., one or more modulated reference signals).

In some examples of the method, apparatuses, and non-transitory computer-readable medium described herein, the one or more reference signals may include one or more synchronization signals.

In some examples of the method, apparatuses, and non-transitory computer-readable medium described herein, transmitting the indication of the one or more interference parameters may include operations, features, means, or instructions for transmitting a set of sequences corresponding to the one or more interference parameters.

In some examples of the method, apparatuses, and non-transitory computer-readable medium described herein, the one or more interference parameters may include a maximum interference power for receiving the first transmission from the first device using the first set of wireless resources.

Some examples of the method, apparatuses, and non-transitory computer-readable medium described herein may further include operations, features, means, or instructions for determining the maximum interference power based on a received signal power value and a target channel quality for communicating with the first device.

In some examples of the method, apparatuses, and non-transitory computer-readable medium described herein, the indication of the one or more interference parameters may be transmitted according to a transmit power parameter for transmissions to the third device.

In some examples of the method, apparatuses, and non-transitory computer-readable medium described herein, the one or more interference parameters may include an interference power adjustment for receiving transmissions from the first device.

Some examples of the method, apparatuses, and non-transitory computer-readable medium described herein may further include operations, features, means, or instructions for determining a current interference level for communications with the first device, and determining the interference power adjustment based on comparing the current interference level with an interference threshold.

In some examples of the method, apparatuses, and non-transitory computer-readable medium described herein, the interference power adjustment may indicate a decrease for a maximum transmit power for the second transmission from the third device to the fourth device, the interference power adjustment based on the current interference level exceeding the interference threshold.

In some examples of the method, apparatuses, and non-transitory computer-readable medium described herein, the interference power adjustment indicates an increase for a maximum transmit power for the second transmission from the third device to the fourth device, the interference power adjustment based on the current interference level not exceeding the interference threshold.

In some examples of the method, apparatuses, and non-transitory computer-readable medium described herein, the indication of the one or more interference parameters may include an indication of a set of time-domain resources for the first set of wireless resources.

In some examples of the method, apparatuses, and non-transitory computer-readable medium described herein, the indication of the one or more interference parameters may include an indication of a set of frequency-domain resources for the first set of wireless resources.

In some examples of the method, apparatuses, and non-transitory computer-readable medium described herein, the set of frequency-domain resources for the first set of wireless resources may be indicated by a frequency location at which the indication may be transmitted.

In some examples of the method, apparatuses, and non-transitory computer-readable medium described herein, the third set of wireless resources at least partially overlaps in frequency with the first set of wireless resources.

In some examples of the method, apparatuses, and non-transitory computer-readable medium described herein, the third set of wireless resources may overlap for a full time duration of the third set of wireless resources with the first set of wireless resources.

In some examples of the method, apparatuses, and non-transitory computer-readable medium described herein, communications between the first device and the second device may include sidelink communications.

In some examples of the method, apparatuses, and non-transitory computer-readable medium described herein, transmitting the indication of the one or more interference parameters to the third device may include sidelink communications.

In some examples of the method, apparatuses, and non-transitory computer-readable medium described herein, the transmission from the third device to the fourth device may include sidelink communications.

A method of wireless communication is described. The method may include receiving an indication of one or more interference parameters for receiving a first transmission from a first device at a second device using a first set of wireless resources, the indication received at a third device from the second device over a third set of wireless resources, determining transmission parameters for communicating with a fourth device using a second set of wireless resources based on the one or more interference parameters received from the second device, the second set of wireless resources at least partially overlapping the first set of wireless resources, and communicating with the fourth device using the second set of wireless resources based on the transmission parameters.

An apparatus for wireless communication is described. The apparatus may include a processor, memory coupled with the processor, and instructions stored in the memory. The instructions may be executable by the processor to cause the apparatus to receive an indication of one or more interference parameters for receiving a first transmission from a first device at a second device using a first set of wireless resources, the indication received at a third device from the second device over a third set of wireless resources, determine transmission parameters for communicating with a fourth device using a second set of wireless resources based on the one or more interference parameters received from the second device, the second set of wireless resources at least partially overlapping the first set of wireless resources, and communicate with the fourth device using the second set of wireless resources based on the transmission parameters.

Another apparatus for wireless communication is described. The apparatus may include means for receiving an indication of one or more interference parameters for receiving a first transmission from a first device at a second device using a first set of wireless resources, the indication received at a third device from the second device over a third set of wireless resources, determining transmission parameters for communicating with a fourth device using a second set of wireless resources based on the one or more interference parameters received from the second device, the second set of wireless resources at least partially overlapping the first set of wireless resources, and communicating with the fourth device using the second set of wireless resources based on the transmission parameters.

A non-transitory computer-readable medium storing code for wireless communication is described. The code may include instructions executable by a processor to receive an indication of one or more interference parameters for receiving a first transmission from a first device at a second device using a first set of wireless resources, the indication received at a third device from the second device over a third set of wireless resources, determine transmission parameters for communicating with a fourth device using a second set of wireless resources based on the one or more interference parameters received from the second device, the second set of wireless resources at least partially overlapping the first set of wireless resources, and communicate with the fourth device using the second set of wireless resources based on the transmission parameters.

In some examples of the method, apparatuses, and non-transitory computer-readable medium described herein, receiving the indication of one or more interference parameters may include operations, features, means, or instructions for periodically receiving the indication of the one or more interference parameters in a set of transmission time intervals.

In some examples of the method, apparatuses, and non-transitory computer-readable medium described herein, communicating with the fourth device may include operations, features, means, or instructions for transmitting one or more transmissions to the fourth device using the second set of wireless resources.

In some examples of the method, apparatuses, and non-transitory computer-readable medium described herein, the third set of wireless resources for receiving the indication of the one or more interference parameters may at least partially overlap in the time domain with the first set of wireless resources for the second device to receive the first transmission from the first device.

In some examples of the method, apparatuses, and non-transitory computer-readable medium described herein, receiving the indication of the one or more interference parameters may include operations, features, means, or instructions for receiving one or more reference signals for the one or more interference parameters.

In some examples of the method, apparatuses, and non-transitory computer-readable medium described herein, the one or more reference signals may include one or more synchronization signals.

In some examples of the method, apparatuses, and non-transitory computer-readable medium described herein, receiving the indication of the one or more interference parameters may include operations, features, means, or instructions for receiving a set of sequences corresponding to the one or more interference parameters.

In some examples of the method, apparatuses, and non-transitory computer-readable medium described herein, the one or more interference parameters may include a maximum interference power for the second device to receive the first transmission from the first device using the first set of wireless resources.

Some examples of the method, apparatuses, and non-transitory computer-readable medium described herein may further include operations, features, means, or instructions for determining a signal quality metric for communicating with the second device, and determining a maximum transmit power for communicating with the fourth device based on the signal quality metric and the maximum interference power.

In some examples of the method, apparatuses, and non-transitory computer-readable medium described herein, determining the signal quality metric may include operations, features, means, or instructions for measuring a path loss for signals received from the second device.

In some examples of the method, apparatuses, and non-transitory computer-readable medium described herein, measuring the path loss may include operations, features, means, or instructions for measuring a receive power of transmissions received from the second device, and determining the path loss based on the receive power and a transmit power parameter for transmissions from the second device.

In some examples of the method, apparatuses, and non-transitory computer-readable medium described herein, the one or more interference parameters may include an interference power adjustment to a maximum interference power for the second device to receive transmissions from the first device.

Some examples of the method, apparatuses, and non-transitory computer-readable medium described herein may further include operations, features, means, or instructions for determining a maximum transmit power for communicating with the fourth device based on the interference power adjustment.

In some examples of the method, apparatuses, and non-transitory computer-readable medium described herein, determining the maximum transmit power for communicating with the fourth device may include operations, features, means, or instructions for increasing the maximum transmit power based on the interference power adjustment indicating an increase of the maximum interference power.

In some examples of the method, apparatuses, and non-transitory computer-readable medium described herein, determining the maximum transmit power for communicating with the fourth device may include operations, features, means, or instructions for decreasing the maximum transmit power based on the interference power adjustment indicating a decrease of the maximum interference power.

In some examples of the method, apparatuses, and non-transitory computer-readable medium described herein, the indication of the one or more interference parameters may include an indication of a set of frequency domain resources for the first set of wireless resources.

In some examples of the method, apparatuses, and non-transitory computer-readable medium described herein, the indication of the one or more interference parameters may include an indication of a set of frequency-domain resources for the first set of wireless resources.

In some examples of the method, apparatuses, and non-transitory computer-readable medium described herein, the set of frequency-domain resources for the first set of wireless resources may be indicated by a frequency location at which the indication of the set of frequency-domain resources may be received.

In some examples of the method, apparatuses, and non-transitory computer-readable medium described herein, communicating with the fourth device may include operations, features, means, or instructions for transmitting a second transmission to the fourth device during the set of time-domain resources according to a maximum transmit power, and transmitting a third transmission to the fourth device outside of the set of time-domain resources according to the maximum transmit power.

In some examples of the method, apparatuses, and non-transitory computer-readable medium described herein, communicating with the fourth device may include operations, features, means, or instructions for transmitting a second transmission to the fourth device during the set of time-domain resources according to a maximum transmit power, and transmitting a third transmission to the fourth device outside of the set of time-domain resources using a transmit power exceeding the maximum transmit power.

Some examples of the method, apparatuses, and non-transitory computer-readable medium described herein may further include operations, features, means, or instructions for determining a signal quality metric based on the transmission parameters for communicating with the fourth device, comparing the signal quality metric with a signal quality threshold, and determining whether the transmission parameters are sufficient for further communications with the fourth device based on the comparing.

In some examples of the method, apparatuses, and non-transitory computer-readable medium described herein, communicating with the fourth device may include operations, features, means, or instructions for determining that the transmission parameters are sufficient for further communications with the fourth device based on the signal quality metric exceeding the signal quality threshold, and performing the further communications with the fourth device based on determining that the transmission parameters are sufficient.

In some examples of the method, apparatuses, and non-transitory computer-readable medium described herein, communicating with the fourth device may include operations, features, means, or instructions for determining that the transmission parameters are not sufficient for further communications with the fourth device based on the signal quality metric not exceeding the signal quality threshold, and determining one or more additional sets of resources for communicating with the fourth device based on determining that the transmission parameters are not sufficient.

In some examples of the method, apparatuses, and non-transitory computer-readable medium described herein, communicating with the fourth device may include operations, features, means, or instructions for communicating with the fourth device during a configured set of time-domain resources according to a maximum transmit power based on the transmission parameters, and communicating with the first device outside of the configured set of time-domain resources according to the maximum transmit power.

In some examples of the method, apparatuses, and non-transitory computer-readable medium described herein, communicating with the fourth device may include operations, features, means, or instructions for communicating with the fourth device during a configured set of time-domain resources according to a maximum transmit power based on the transmission parameters, and communicating with the first device outside of the configured set of time-domain resources using a transmit power exceeding the maximum transmit power.

In some examples of the method, apparatuses, and non-transitory computer-readable medium described herein, the second device receiving the first transmission from the first device may include sidelink communications.

In some examples of the method, apparatuses, and non-transitory computer-readable medium described herein, receiving the indication of one or more interference parameters may include operations, features, means, or instructions for sidelink communications.

In some examples of the method, apparatuses, and non-transitory computer-readable medium described herein, communicating with the fourth device may include operations, features, means, or instructions for sidelink communications.

In some examples of the method, apparatuses, and non-transitory computer-readable medium described herein, receiving the indication of the one or more interference parameters from the second device over the third set of wireless resources and communicating with the fourth device using the second set of wireless resources may include operations, features, means, or instructions for a full-duplex operation.

DETAILED DESCRIPTION

Figure 1:
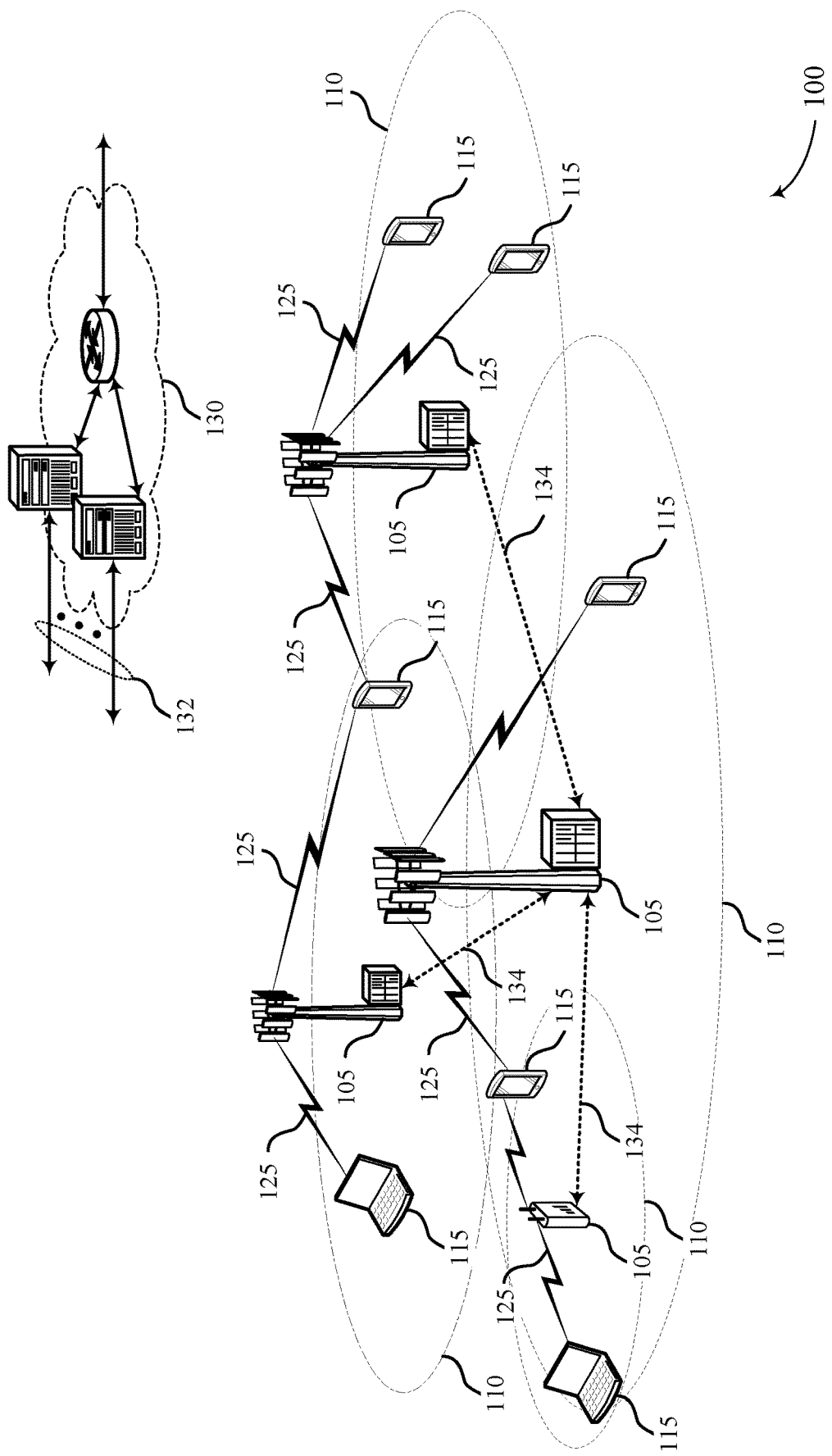
FIG. 1 illustrates an example of a wireless communications system that supports interference power control for sidelink communications in accordance with aspects of the present disclosure.

In some wireless communications systems (e.g., next generation wireless networks, fifth generation (5G) communications systems, New Radio (NR) communications systems, etc.), ultra-high data rates and a wide scope of application scenarios may be expected to be supported. Accordingly, wireless full-duplex communications is an emerging technique and may be capable of increasing (e.g., doubling) the link capacity that can accommodate the ultra-high data rates and wide scope of application scenarios. Wireless full-duplex may include enabling radio network nodes to transmit and receive simultaneously on a same frequency band and at a same time slot (i.e., using overlapping sets of time and frequency resources). A full-duplex communications device, such as a base station or a user equipment (UE), may simultaneously transmit and receive communications with other devices. It is expected that, by doubling each single-link capacity, full-duplexing communications may increase communications system throughput in diverse applications in wireless communication networks while also reducing a transfer latency for time sensitive services.

In some cases, a first full-duplex UE may be subject to cross-interference caused by sidelink transmissions between other UEs using resources overlapping with those used by the first UE. To avoid or mitigate this type of interference, a second UE (e.g., a transmitting UE) may listen for transmissions before transmitting so as not to cause interference by transmitting over a same set of resources that are already used for other parallel transmissions. If the second UE senses a transmission (e.g., a transmission transmitted by the first UE), the second UE may determine not to transmit or to transmit using different resources. In some cases, however, an obstacle may be located between the first UE and the second UE. In this case, the second UE may not detect the transmission from the first UE. Thus, the second UE may transmit using the same set of resources as the first UE, which may result in interference between the two transmissions.

One technique to mitigate the interference in this situation may include a receiving UE (e.g., a UE to receive a transmission from the first UE, a full-duplex UE) transmitting a signal to mute transmissions from other devices while receiving the transmission from the first UE. A device that receives the signal, such as the second UE, may accordingly determine not to use these resources to send transmissions. However, while this technique may reduce interference for these transmissions, it may provide a relatively less efficient utilization of the resources by muting the potentially interfering transmissions. For example, rather than muting these transmissions, different sidelink communications applications may have different interference power requirements, and thus the different sidelink communications may, in some cases, coexist using the same set of resources. For example, a level of allowable interference may vary based on a received signal power for the transmission received at the first UE, an interference cancellation capability of the first UE, and other like parameters or combinations thereof. Thus, in some cases, absolute muting of potentially interfering transmissions may relatively inefficiently utilize spectral resources.

Techniques are provided herein by which a receiving UE (i.e., the UE to receive one or more first sidelink transmissions from a first UE) may configure and signal one or more interference parameters, such as a maximum transmit power (or, alternatively referred to as a maximum transmission power) during communications between the first UE and the receiving UE such that other devices in the vicinity may communicate over the same resources. For example, the receiving UE may transmit (e.g., broadcast) one or more interference notification signals, which may include a transmission while receiving the first sidelink transmissions from the first UE. Other nearby devices may receive the interference notification signals and use information contained in the interference notification signals to configure transmission parameters for transmitting additional sidelink transmissions. For example, the interference notification signals may include information indicating one or more of a maximum allowable interference power, an interference power adjustment, or the resources (e.g., time-domain resources) that the receiving UE may use to receive the first sidelink transmissions from the first UE. Based on the information included in the interference notification signals, a second UE may determine transmission parameters (e.g., a maximum transmit power) with which to transmit additional sidelink transmissions to a further UE using resources that at least partially overlap (e.g., in the time domain, in the frequency domain) with resources used by the first UE to transmit the first sidelink transmissions to the receiving UE.

Aspects of the disclosure are initially described in the context of a wireless communications system. Aspects of the disclosure are then described in the context of a wireless communications system, a transmission timeline, and a process flow. Aspects of the disclosure are further illustrated by and described with reference to apparatus diagrams, system diagrams, and flowcharts that relate to interference power control for sidelink communications.

FIG. 1 illustrates an example of a wireless communications system 100 that supports interference power control for sidelink communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems (e.g., next generation wireless networks, 5G networks, NR, etc.), ultra-high data rates and a wide scope of application scenarios may be expected to be supported. Wireless full-duplex communications is an emerging technique that may be capable of increasing (e.g., doubling) the link capacity that can accommodate the ultra-high data rates and wide scope of application scenarios. Wireless full-duplex may include enabling radio network nodes to transmit and receive simultaneously on a same frequency band and at a same time slot (i.e., using overlapping sets of time and frequency resources). This simultaneous communication using the same frequency band at the same time may contrast with conventional operations (e.g., half-duplex operation, non-full-duplex operations, etc.) where transmission and reception differ in time and/or in frequency. A full-duplex network node, such as a base station 105 in a cellular network, may communicate simultaneously in uplink and downlink with two half-duplex terminals (e.g., half-duplex UEs 115) using the same radio resources (e.g., same time-frequency resources). In another implementation, a relay node (e.g., an IAB node) may communicate simultaneously with an anchor node (e.g., an IAB parent node) and a child node (e.g., a UE 115 or IAB child node) in a one-hop scenario or with two other relay nodes in a multi-hop scenario. It is expected that by doubling each single-link capacity, full-duplexing communications may increase communications system throughput in diverse applications in wireless communication networks while also reducing a transfer latency for time sensitive services.

In some cases, a UE 115 may be full-duplex-capable, where the UE 115 is capable of simultaneously transmitting to another device (e.g., a second UE 115) and receiving other transmissions from a further device (e.g., a third UE) using at least partially overlapping time-frequency resources. In some cases, such a full-duplex UE 115 may be subject to self-interference from the concurrent uplink communications and downlink communications. To mitigate self-interference resulting from such full-duplex communications, the UE 115 may perform an interference cancellation procedure (e.g., to cancel strong self-interference). That is, the UE 115 may suppress self-interference using one or more interference canceling techniques. For example, the UE 115 may mitigate self-interference through beamforming, analog cancellation, digital cancellation, or antenna cancellation, or various combinations thereof.

In some cases, a first UE 115 (e.g., a full-duplex UE) may be subject to cross-interference caused by transmissions (e.g., sidelink or other transmissions) between other UEs 115 using resources overlapping with those used by the first UE 115, and the techniques to mitigate self-interference may not account for cross-interference. In some cases, to avoid or mitigate this type of interference, a second UE 115 (e.g., a transmitting UE 115) may listen for transmissions before transmitting so as not to cause interference by transmitting over a same set of resources that are already used for other parallel transmissions. If the second UE 115 senses a transmission (e.g., a transmission transmitted by the first UE 115), the second UE 115 may determine not to transmit or to transmit using different resources.

In some cases, however, an obstacle may be located between the first UE 115 and the second UE 115. In this case, the second UE 115 may not detect the transmission from the first UE 115. Thus, the second UE 115 may transmit using the same set of resources as the first UE 115, which may result in interference between the two transmissions. One technique to mitigate the interference in this situation may include a receiving UE 115 (e.g., a UE 115 to receive a transmission from the first UE 115, a full-duplex UE) being configured to transmit a signal to mute transmissions from other devices while receiving the transmission from the first UE 115. A device that receives the signal, such as the second UE 115, may accordingly determine not to use these resources to send transmissions.

However, while this technique may reduce interference for these transmissions, it may provide a relatively less efficient utilization of the resources by muting the potentially interfering transmissions. For example, rather than muting these transmissions, different sidelink communications applications may have different interference power requirements, and thus the different sidelink communications may, in some cases, coexist using the same set of resources. For example, a level of allowable interference may vary based on one or more of a received signal power for the transmission received from the first UE 115, an interference cancellation capability of the receiving UE 115, and other like parameters. Thus, in some cases, absolute muting of potentially interfering transmissions may relatively inefficiently utilize spectral resources.

Techniques are provided herein by which a receiving UE 115 (e.g., a UE 115 to receive one or more first sidelink transmissions from the first UE 115) may configure and signal one or more interference parameters, such as a maximum transmit power (or, alternatively referred to as a maximum transmission power), for communications between the first UE 115 and the receiving UE 115 such that other devices in the vicinity may communicate over the same resources. For example, the receiving UE 115 may transmit (e.g., broadcast) one or more interference notification signals (e.g., while receiving the first sidelink transmissions from the first UE 115), such that other nearby devices may receive the interference notification signals and use information contained in the interference notification signals to configure transmission parameters for transmitting additional sidelink transmissions. For example, the interference notification signals may include information indicating one or more of a maximum allowable interference power, an interference power adjustment, or the resources (e.g., time-domain resources) that the receiving UE 115 may use to receive the first sidelink transmissions from the first UE 115. Based on the information included in the interference notification signals, the second UE 115 may determine transmission parameters (e.g., a maximum transmit power) with which to transmit the additional sidelink transmissions to a further UE 115 using resources that at least partially overlap resources used by the first UE 115 to transmit the first sidelink transmissions to the receiving UE 115.

Figure 2:
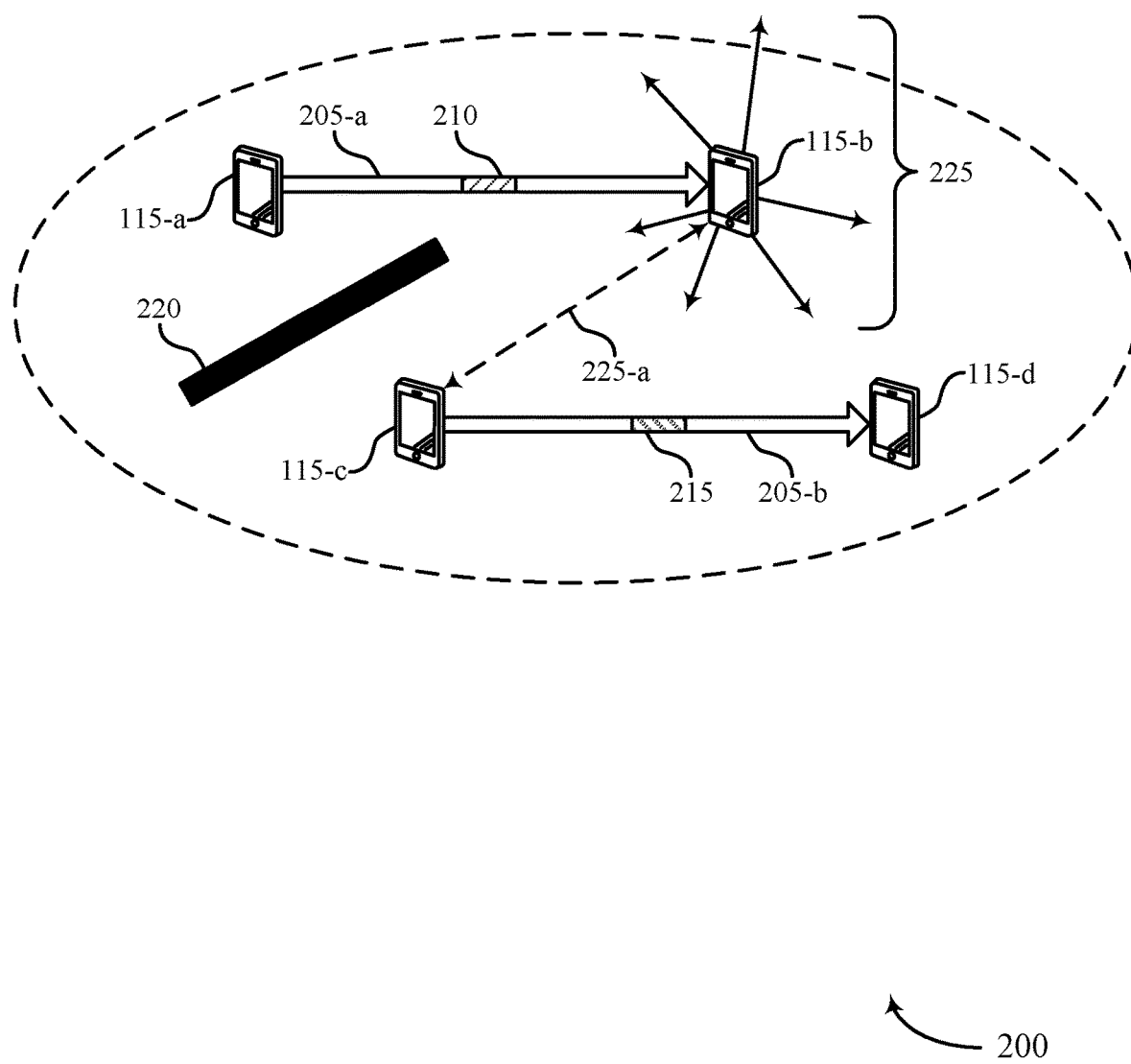
FIG. 2 illustrates an example of a wireless communications system that supports interference power control for sidelink communications in accordance with aspects of the present disclosure.

FIG. 2 illustrates an example of a wireless communications system 200 that supports interference power control for sidelink communications in accordance with aspects of the present disclosure. In some examples, the wireless communications system 200 may implement aspects of the wireless communications system 100, as described with reference to FIG. 1. In the example of FIG. 2, the wireless communications system 200 may include multiple UEs 115, which may be examples of the UEs 115 described with reference to FIG. 1. The UEs 115 may communicate with one another using respective sidelink channels 205, for example, via respective directional (e.g., beamformed) transmissions.

In some examples, the sidelink channels 205 may correspond to a radio interface between two UEs 115 that may not require assistance from a network (e.g., a proximity services interface, such as a PC5 or vehicle-to-everything (V2X) interface). As described herein, the sidelink channels 205 may be a directional link between one UE 115 and another UE 115, for example, formed using beamforming techniques (such as with mmW communications). As shown in the illustrative example of FIG. 2, a first UE 115-*a* may communicate with a second UE 115-*b* over a first sidelink channel 205-*a* and a third UE 115-*c* may communicate with a fourth UE 115-*d* over a second sidelink channel 205-*b*.

In some cases, as described with reference to FIG. 1, a UE 115 (e.g., the UE 115-*b*) may be full-duplex-capable, where the UE 115-*b* is capable of simultaneously transmitting to another device (e.g., the UE 115-*c*) and receiving other transmissions from a further device (e.g., the UE 115-*a*) using at least partially overlapping time-frequency resources. In some cases, radio resources (e.g., time, frequency, and/or spatial resources) for sidelink communications may be configured according to different modes. For example, in a first mode (e.g., a "Mode 1"), a base station may transmit an indication to a UE 115 (e.g., the UE 115-*a*) scheduling resources for sidelink communications with another UE 115 (e.g., the UE 115-*b*). Additionally or alternatively, in a second mode (e.g., a "Mode 2"), a UE 115 (e.g., the UE 115-*a*) may determine sidelink resources that the UE 115 is to use for sidelink communications (e.g., with the UE 115-*b*) from a set of preconfigured resources or resources that have been configured, for example, according to previous signaling from a base station or other network device.

In some cases, UEs 115 may be subject to self-interference from these concurrent uplink communications and downlink communications. To mitigate self-interference resulting from such full-duplex communications, the UE 115-*b* may perform an interference cancellation procedure (e.g., to cancel strong self-interference). That is, the UE 115-*b* may suppress self-interference using one or more interference canceling techniques. For example, the UE 115-*b* may mitigate self-interference through beamforming, analog cancellation, digital cancellation, or antenna cancellation, or various combinations thereof.

In some cases, the UEs 115 may also be subject to cross-interference caused by transmissions (e.g., sidelink transmissions) between other UEs 115, and the techniques to mitigate self-interference may not account for cross-interference. For example, after being allocated or determining resources (e.g., for sidelink communications), the UE 115-*a* may transmit one or more first sidelink transmissions 210 to the UE 115-*b* using the first sidelink channel 205-*a* (e.g., according to the allocated or determined resources), and the UE 115-*c* may likewise transmit one or more second sidelink transmissions 215 to the UE 115-*d* using the second sidelink channel 205-*b*. In some cases, the first sidelink transmissions 210 and the second sidelink transmissions 215 may use partially or fully overlapping sets of resources (e.g., in frequency and time) and may thus cause interference at adjacent UEs 115 receiving these communications. For example, the UE 115-*b* may receive the first sidelink transmissions 210 from the UE 115-*a*, but the transmission of the second sidelink transmissions 215 to the UE 115-*d* may interfere with the successful reception of the first sidelink transmissions 210 at the UE 115-*b* (e.g., causing an incorrect decoding of a certain amount of the bits of the first sidelink transmissions 210). Similarly, the UE 115-*d* may receive the second sidelink transmissions 215 from the UE 115-*c*, but the transmission of the first sidelink transmissions 210 to the UE 115-*b* may interfere with the successful reception of the second sidelink transmissions 215 at the UE 115-*d*.

In some cases, to avoid or mitigate this type of interference, a transmitting UE 115 or a lower priority UE 115 may listen for transmissions before transmitting so as not to cause interference by transmitting over a same set of resources that are already used for other parallel transmissions. In such a case, for example, with reference to FIG. 2, communications between the UE 115-*a* and the UE 115-*b* may be associated with a first service priority, and communications between the UE 115-*c* and the UE 115-*d* may be associated with a second service priority that is an equal priority or a lower priority than the first service priority. The UE 115-*a* may first transmit the first sidelink transmissions 210 to the UE 115-*b* over a certain set of resources, and the UE 115-*c* may be configured to transmit the second sidelink transmissions 215 to the UE 115-*d* using the same set of resources (or, e.g., an overlapping set of resources). The UE 115-*c* may first listen (e.g., performing an energy sensing procedure) to these resources before transmitting the second sidelink transmissions 215 to the UE 115-*d*. If the UE 115-*c* senses the first sidelink transmissions 210 transmitted by the UE 115-*a*, the UE 115-*c* may determine not to transmit or may determine different resources to transmit the second sidelink transmissions 215.

In some cases, however, as shown in the illustrative example of FIG. 2, an obstacle 220 (e.g., physical blockage such as a wall, machinery, a moving vehicle, etc.) may be located between the UE 115-*a* and the UE 115-*c*. In this case, the UE 115-*c* may not detect the transmission of the first sidelink transmissions 210 from the UE 115-*a*. Based on the UE 115-*c* not detecting the first sidelink transmissions 210, the UE 115-*c* may determine that the same resources are available for transmission, and the UE 115-*c* may accordingly transmit the second sidelink transmissions 215 to the UE 115-*d* over the same resources. In some cases, because the first sidelink transmissions 210 and the second sidelink transmissions 215 are transmitted over the same set of resources (e.g., overlapping time and frequency resources), the second sidelink transmissions 215 may interfere with the reception of the first sidelink transmissions 210 at the UE 115-*b*, where the first sidelink transmissions 210 may be higher priority communication than the second sidelink transmissions 215.

Some techniques to mitigate the interference may be used in this situation when the UEs 115 (e.g., the UE 115-*b*) support full-duplex communications. For example, the full-duplex UE 115-*b* may transmit a signal to mute transmissions from other devices while concurrently receiving transmissions from the UE 115-*a*, where the transmitted signal and the received transmissions use the set of resources (e.g., using the same frequency resources). Accordingly, a device that receives the signal, such as the UE 115-*c*, may identify that other communications in its vicinity are using these resources, and the UE 115-*c* would not use these resources to communicate with the UE 115-*d*. In this way, the UE 115-*b* may continue to receive transmissions from the UE 115-*a* while informing other devices to avoid interfering with the received transmissions without a knowledge of whether other devices are in its vicinity.

However, while this technique may reduce interference for transmissions using the first sidelink channel 205-*a*, it may provide a relatively less efficient utilization of the resources by muting the potentially interfering transmissions. For example, rather than muting these transmissions, different sidelink communications applications may have different interference power requirements, and thus the different sidelink communications may, in some cases, coexist using the same set of resources. For example, a level of allowable interference may vary based on a received signal power for the transmission received at the UE 115-*b*, an interference cancellation capability of the UE 115-*b*, or other like parameters or combinations thereof. For example, if a distance between the UE 115-*a* and the UE 115-*b* is relatively shorter, a received signal power may be relatively greater, and an allowable received interference power level may accordingly be relatively larger (e.g., as compared to a relatively greater distance between the UE 115-*a* and the UE 115-*b*). Likewise, if the UE 115-*b* is equipped with an antenna having cancellation capabilities, such as some multi-antenna implementations, the UE 115-*b* may cancel a greater level of interference, and thus an allowable received interference power level may also be relatively larger. Thus, in some cases, absolute muting of transmissions over the second sidelink channel 205-*b* by the UE 115-*c* may relatively inefficiently utilize spectral resources.

Techniques are provided herein by which the UE 115-*b* may configure and signal one or more interference parameters, such as a maximum transmit power (or, alternatively referred to as a maximum transmission power) during communications between the UE 115-*a* and the UE 115-*b* such that other devices in the vicinity may communicate over the same resources. For example, a full-duplex UE 115-*b* may transmit (e.g., broadcast) one or more interference notification signals 225, which may or may not include a transmission concurrently with receiving the first sidelink transmission 210 from the UE 115-*a* (e.g., using the same time resources, in a full duplex operation). In such examples, other nearby devices, such as the UE 115-*c*, may receive one or more of the interference notification signals 225 (e.g., interference notification signal 225-*a*) and use information contained in an interference notification signal 225 to configure transmission parameters for transmitting the second sidelink transmissions 215. For example, the interference notification signals 225 may include information indicating a maximum allowable interference power, an interference power adjustment, or the resources that the UE 115-*b* may use to receive the first sidelink transmissions 210 from the UE 115-*a*, or any combination thereof. Upon receiving one or more interference notification signals 225, and based on the information included in the interference notification signals 225, the UE 115-*c* may determine transmission parameters, such as a maximum transmit power, with which to transmit the second sidelink transmissions 215 to the UE 115-*d* (e.g., over an existing communication link, such as the sidelink channel 205-*b*). The UE 115-*c* may then transmit the first sidelink transmissions 210 to the UE 115-*d* according to the determined transmission parameters.

In some cases, according to the techniques described herein, the UE 115-*b* may determine a maximum amount of interference that it may experience such that the UE 115-*b* may successfully receive a transmission (e.g., the one or more first sidelink transmissions 210) from the UE 115-*a*. For example, the UE 115-*b* may calculate a maximum allowable interference power $P_{i,max}$ based on a received signal power $P_{rx,B}$ for transmission received from the UE 115-*a* and a target channel quality metric (e.g., a signal-to-interference-plus-noise ratio (SINR)) γ. The maximum allowable interference power may be calculated by subtracting the SINR γ from the received signal power $P_{rx,B}$, that is, according the equation:

$$P_{i,max} = P_{rx,B} - \gamma. \quad (1)$$

In some cases, the UE 115-*b* may transmit (e.g., broadcast) the calculated value for the maximum allowable interference power $P_{i,max}$ in the interference notification signals 225. The interference notification signals 225 may, for example, include information indicating the maximum allowable interference power $P_{i,max}$ in a field or subfield (e.g., in addition to or alternatively to a sequence corresponding to the value, and the other signaling techniques described herein) for a maximum allowable interference power parameter. In some cases, the UE 115-*b* may adjust the value of the interference power $P_{i,max}$ to control an interference power, that is, a maximum level of interference that the UE 115-*b* can experience while successfully receiving the first sidelink transmissions 210 (e.g., such that the UE 115-*b* may decode the information bits of the first sidelink transmissions 210 at or above a target success rate threshold). For example, the UE 115-*b* may increase the value of the interference power $P_{i,max}$ to indicate an increase to the maximum interference power, or the UE 115-*b* may decrease the value of the interference power $P_{i,max}$ to indicate a decrease to the maximum interference power.

Figure 3:
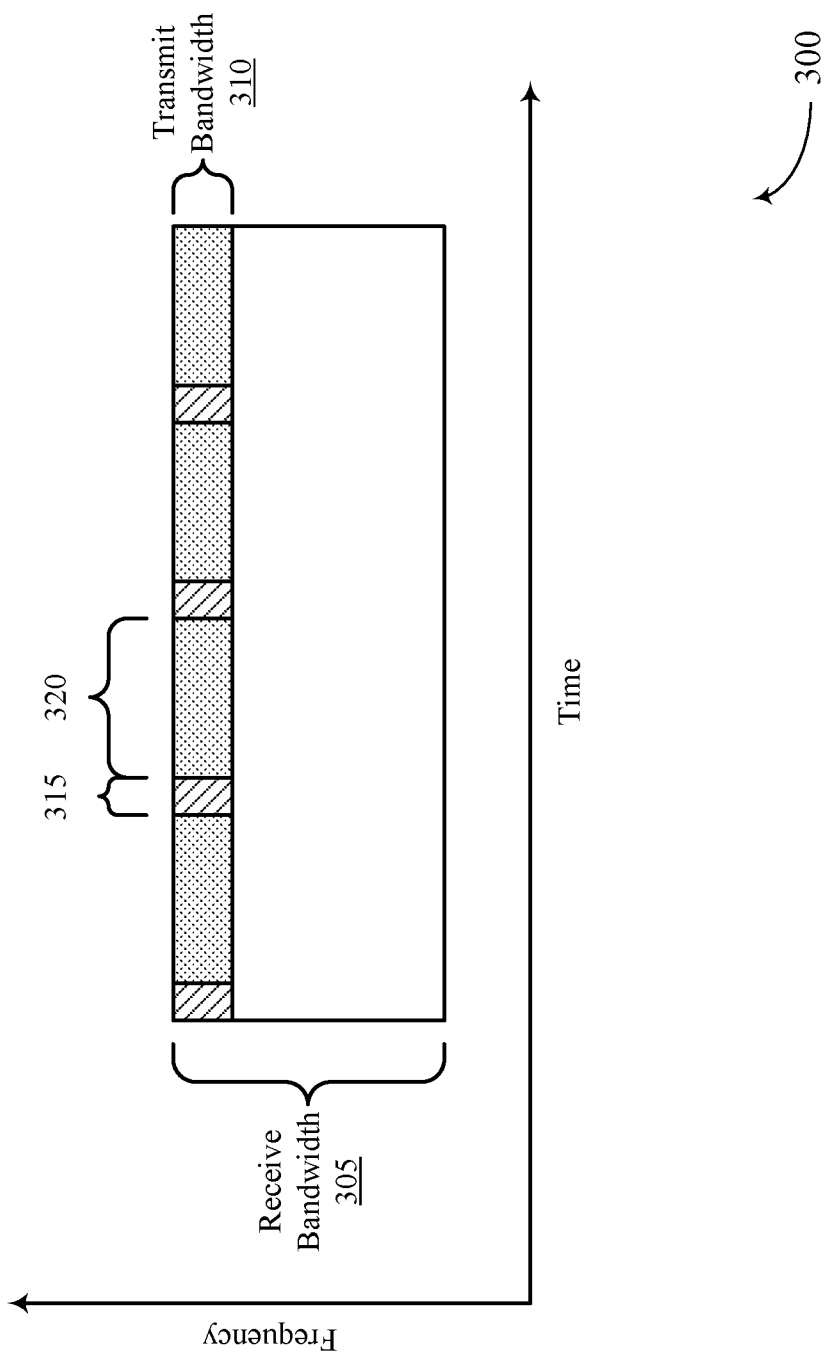
FIG. 3 illustrates an example of a transmission timeline that supports interference power control for sidelink communications in accordance with aspects of the present disclosure.

FIG. 3 illustrates an example of a transmission timeline 300 that supports interference power control for sidelink communications in accordance with aspects of the present disclosure. In some aspects, the transmission timelines 300 may implement aspects of the wireless communications systems 100 and 200, as described with reference to FIGS. 1 and 2, respectively. The transmission timeline 300 is illustrated to represent frequency-domain resources along the y-axis and time-domain resources along the x-axis. The transmission timeline 300 may include operations performed to implement communications at a UE 115, such as the UE 115-*b*, as described with reference to FIG. 2. The example transmission timeline 300 may illustrate an example of a resource allocation for transmissions at the UE 115-*b* over a physical sidelink shared channel (PSSCH).

The example transmission timeline 300 shows a total receive bandwidth 305 for the PSSCH. The example transmission timeline 300 also shows a transmit bandwidth 310 within which the UE 115-*b* may transmit interference notification signaling corresponding to signals received at the UE 115-*b*. As shown by the example transmission timeline 300, the frequency resources of the transmit bandwidth 310 may fully overlap with the frequency resources for the receive bandwidth 305. In other cases, the frequency resources of the transmit bandwidth 310 may partially overlap with the frequency resources for the receive bandwidth 305, or the frequency resources of the transmit bandwidth 310 may not overlap with the frequency resources for the receive bandwidth 305.

The example transmission timeline 300 shows periodic time resources allocated for transmission of reference signals 315 (e.g., synchronization signals (SSs), demodulation reference signals (DMRSs), etc.) and data portions 320. The resource position for each data portion 320 may begin at the end of the resources for each reference signal 315, and the resource position for each reference signal 315 may begin at the end of the resources for each data portion 320. In this way, the UE 115-*b* may transmit periodic reference signals 315 and data portions 320 for an entire duration of the time resources for which the UE 115-*b* may transmit transmissions to declare the resource occupation for the full duration of the resources. The reference signals 315 and data portions 320 may be periodic (i.e., defined by a certain period) and have a minimum timing granularity of one transmission time interval (TTI), which may be, for example, one symbol.

With reference again to FIG. 2, in some cases, the interference notification signals 225, including the one or more interference parameters (e.g., a maximum transmit power), may be associated with the reference signals (e.g., SSs, DMRSs, etc.), as described with reference to FIG. 3. In some cases, the reference signals may be transmitted with a same set of quasi-co-location (QCL) information. QCL information may indicate that these different signals may have a QCL relationship (e.g., that the antenna ports used for transmitting the signals may share one or more characteristics, such as one or more spatial characteristics). The UE 115-*b* may then transmit the interference notification signal 225 together with the reference signals. Upon receiving the reference signals based on the QCL information, a receiving UE (e.g., the UE 115-c) may demodulate and decode the data portions to obtain the one or more interference parameters.

Additionally or alternatively, the UE 115-b may transmit one or more sequences (e.g., of a set of sequences), where a sequence may correspond to a particular value or set of values. Through the correspondence of sequences to interference parameters, the UE 115-b may transmit the interference notification signals 225 with an amount of repetition, which may increase the likelihood that the interference notification signals 225 are received and that the information included in the interference notification signals 225 are correctly communicated. In some cases, the set of sequences may include a number of sequences, where each sequence of the set of sequences may correspond to a value (or values) for one or more of a maximum allowable interference power parameter. Additionally or alternatively, each sequence of the set of sequences may correspond to a value (or values) for an interference power adjustment parameter. Further additionally or alternatively, each sequence of the set of sequences may correspond to a value (or values) for one or more resource allocation parameters (e.g., corresponding to respective values for time-domain resource lengths).

In some cases, the UE 115-c may transmit the second sidelink transmissions 215 to the UE 115-d according to transmission parameters determined based at least in part on a received interference notification signal 225, for example, the determined maximum transmit power. In some cases, the UE 115-c may transmit the second sidelink transmissions 215 using frequency-domain resources based on the band or subband (with a size, or bandwidth, equal to, e.g., a configured size parameter for the band or subband) within which the UE 115-c received one or more interference notification signals 225. For example, the UE 115-c may determine that the UE 115-c is to transmit the second sidelink transmissions 215 at a frequency position in a subband that covers (e.g., overlaps) the frequency position at which the UE 115-c received the interference notification signals 225. In some cases, the UE 115-c may transmit the second sidelink transmissions 215 using a time-domain resource position based on the time-domain resource position that the UE 115-c received the interference notification signals 225. For example, the UE 115-c may determine to transmit the second sidelink transmissions 215 using a set of time-domain resources having a configured length starting from the occasion at which the UE 115-c received the interference notification signals 225.

The UE 115-c may receive a transmission of the interference notification signals 225 from the UE 115-b, for example, an interference notification signal 225-a. Based on the information included in the interference notification signal 225-a, the UE 115-c may determine one or more transmission parameters with which to transmit the second sidelink transmissions 215 to the UE 115-d using the sidelink channel 205-b. For example, the interference notification signal 225-a may include information (e.g., a parameter or set of parameters) indicating the value for the maximum allowable interference power $P_{i,max}$. The UE 115-c may determine a maximum transmit power for transmitting the second sidelink transmissions 215 to the UE 115-d according to the received value for the maximum allowable interference power $P_{i,max}$.

In some examples, after receiving the interference notification signal 225-a indicating the maximum allowable interference power $P_{i,max}$, the UE 115-c may measure a signal quality metric (e.g., path loss) of an interference notification signal 225-a received from the UE 115-b (and/or other signals received from the UE 115-b, e.g., reference signals). For example, the UE 115-c may measure a received signal power $P_{rx,C}$ of the interference notification signal 225-a received from the UE 115-b and calculate a path loss metric corresponding to communications between the UE 115-b and the UE 115-c. The path loss $PL_{C2B}$ (i.e., the path loss for communications from UE 115-c to UE 115-b) may be calculated by subtracting the received signal power $P_{rx,C}$ of the interference notification signal 225-a from a transmit power $P_{tx,B}$ that the UE 115-b used to transmit the interference notification signal 225-a. The path loss $PL_{C2B}$ may be equal to the $PL_{B2C}$ (i.e., the path loss for communications from UE 115-b to UE 115-c), as the path loss may be substantially the same in either communication direction with substantially the same signal quality characteristics in either direction. The transmit power $P_{tx,B}$ that the UE 115-b used to transmit the interference notification signal 225-a may be configured and provided to the UE 115-c ahead of time (e.g., according to a set regulation), or may have been otherwise indicated to the UE 115-c (e.g., by the UE 115-b, by a base station, or by another network device). Thus, the path loss $PL_{C2B}$ may be calculated according to the equation:

$$PL_{C2B}=PL_{B2C}=P_{tx,B}-P_{rx,C} \qquad (2)$$

Based on the value for the maximum allowable interference power $P_{i,max}$ received in the interference notification signal 225-a from the UE 115-b and the determined value for the associated path loss $PL_{C2B}$, the UE 115-c may calculate a maximum transmit power $P_{tx,C,max}$ for transmissions at the UE 115-c. For example, the maximum transmit power $P_{tx,C,max}$ may set a maximum transmit power that the UE 115-c may use to transmit the second sidelink transmissions 215 to the UE 115-d using the resources (e.g., frequency and/or time resources) associated with, or as indicated by, the interference notification signal 225-a. The UE 115-c may calculate the maximum transmit power $P_{tx,C,max}$ by adding the determined value for the path loss $PL_{C2B}$ to the received value for the maximum allowable interference power $P_{i,max}$ (e.g., the subtraction of the SINR γ from the received signal power $P_{rx,B}$), according to the equation:

$$P_{tx,C,max}=P_{i,max}-PL_{C2B} \qquad (3)$$

Additionally or alternatively, according to the techniques described herein, the UE 115-b may determine a value for an interference power adjustment based on an amount of interference that the UE 115-b experiences when receiving the first sidelink transmissions 210 from the UE 115-a. For example, the UE 115-b may be configured with a threshold (e.g., 110 decibel (dB)) for an amount of interference based on which the UE 115-b may determine to signal an interference power adjustment (the threshold, e.g., associated with a spatial relationship of the UEs 115, device capabilities of the UE 115-b, etc.). For example, the UE 115-b may measure an amount of suffered interference (e.g., according to the received power and transmit power calculation described herein), and compare the measured interference with the threshold. If, for example, the interference measured by the UE 115-b exceeds the threshold, the UE 115-b may signal a negative value to the UE 115-c, indicating that the UE 115-c is to decrease its maximum transmit power. Alternatively, if, for example, the interference measured by the UE 115-b does not exceed the threshold (e.g., by a certain margin), the UE 115-b may signal a positive value to the UE 115-c, indicating that the UE 115-c may increase its maximum transmit power.

The UE 115-*b* may transmit (e.g., broadcast) the determined value for the interference power adjustment in the interference notification signals 225. The interference notification signals 225 may, for example, include information indicating the interference power adjustment in a field or subfield (e.g., in addition to or alternatively to a sequence corresponding to the value, and the other signaling techniques described herein) for an interference power adjustment parameter.

As described herein, the UE 115-*c* may receive the interference notification signal 225-*a* and accordingly determine one or more transmission parameters with which to transmit the second sidelink transmissions 215 to the UE 115-*d* using the sidelink channel 205-*b*. For example, the interference notification signal 225-*a* may include information (e.g., a parameter or set of parameters) indicating a value for the interference power adjustment. The UE 115-*c* may then adjust its maximum transmit power for transmitting to the UE 115-*d* according to the received value for the interference power adjustment. For example, if the interference power adjustment value indicates a positive value, the UE 115-*c* may increase its maximum transmit power according to the indicated value, and if the interference power adjustment value indicates a negative value, the UE 115-*c* may decrease its maximum transmit power according to the indicated value.

Additionally or alternatively, the interference notification signals 225 may include information indicating one or more resource allocation parameters (e.g., corresponding to respective values for time-domain resource lengths). For example, the interference notification signals 225 may include a field or subfield (e.g., in addition to or alternatively to a sequence corresponding to the value, and the other signaling techniques described herein) the one or more resource allocation parameters. For example, the one or more resource allocation parameters may indicate the set of time-domain resources that the UE 115-*b* is to receive the one or more first sidelink transmissions 210 from the UE 115-*a* over, and that the UE 115-*b* may correspondingly transmit overlapping interference notification signals (e.g., by indicating a starting point and an ending point, a starting point and a duration, a timestamp and a remaining duration, etc., or any combination thereof).

The UE 115-*c* may receive the interference notification signal 225-*a* including the one or more resource allocation parameters and accordingly determine one or more transmission parameters with which to transmit the second sidelink transmissions 215 to the UE 115-*d* using the sidelink channel 205-*b*. For example, the UE 115-*c* may determine a set of time-domain resources with a length (i.e., duration) configured according to the one or more resource allocation parameters for transmitting the second sidelink transmissions 215 (e.g., according to a time-domain resource length parameter indicating that the valid time-domain resource length is equal to the time-domain resources that the UE 115-*a* transmits to the UE 115-*b* and the UE 115-*b* correspondingly transmits the interference notification signals 225). Alternatively, in some cases the interference notification signals 225 may not provide an indication of the time-domain resources, in which case the UE 115-*c* may use a time-domain resource length according to a previously configured or regulated parameter.

The UE 115-*c* may determine a maximum transmit power for these time-domain resources (e.g., according to the techniques described herein, or according to a configured or regulated value), and the UE 115-*c* may transmit a signal (e.g., one or more second sidelink transmissions 215) using the time-domain resources and the determined maximum transmit power. Following the end of these time-domain resources, the UE 115-*c* may transmit further sidelink transmissions to the UE 115-*d* using the second sidelink channel 205-*b*. In this case, because the time-domain resources indicate that the UE 115-*a* is no longer transmitting to the UE 115-*b*, the UE 115-*c* may not limit its transmit power. Thus, the UE 115-*c* may transmit these further sidelink transmission to the UE 115-*d* using a maximum transmit power that may exceed the previously determined maximum transmit power (as needed, and subject to universal and other maximum transmit power constraints).

In some cases, after determining the maximum transmit power and the time-domain resources, the UE 115-*c* may determine whether the maximum transmission power is large enough to effectively communicate during these time-frequency resources. The UE 115-*c* may determine a signal quality metric (e.g., a SINR) for the second sidelink transmission 215 as received at the UE 115-*d*. For example, the UE 115-*d* may provide feedback to the UE 115-*c* indicated a receive power for the second sidelink transmission 215. Alternatively, other signal quality feedback methods may be used, such as an acknowledgement (ACK) or negative acknowledgement (NACK), ARQ, and the like.

The UE 115-*c* may be configured with a threshold for the signal quality metric based on which the UE 115-*c* may determine whether the signal quality is sufficient for communicating with the UE 115-*d* (the threshold, e.g., associated with a spatial relationship of the UEs 115, device capabilities of the UE 115-*d*, etc.).

The UE 115-*c* may compare the signal quality metric with the threshold and determine whether the link with the UE 115-*d* is of sufficient quality for communicating the second sidelink transmissions 215 (or similarly for other types of feedback). If, for example, the signal quality metric indicated by the UE 115-*d* exceeds the threshold, the UE 115-*c* may determine that the link is of sufficient quality and the UE 115-*c* may continue to transmit to the UE 115-*d* according to the maximum transmit power and the time-domain resources indicated by the interference notification signal 225-*a*. Alternatively, if, for example, the signal quality metric indicated by the UE 115-*d* does not exceed the threshold, the UE 115-*c* may determine that the link is not of sufficient quality.

In this case, the UE 115-*c* may monitor other frequency-domain resources (e.g., by performing an energy sensing procedure and the like) to locate other time-frequency resources that may be available to transmit to the UE 115-*d*. The UE 115-*c* may accordingly transmit to the UE 115-*d* once the UE 115-*c* has located available resources that the UE 115-*c* may use to transmit with a maximum transmit power that is sufficient given its signal quality requirements.

Figure 4:
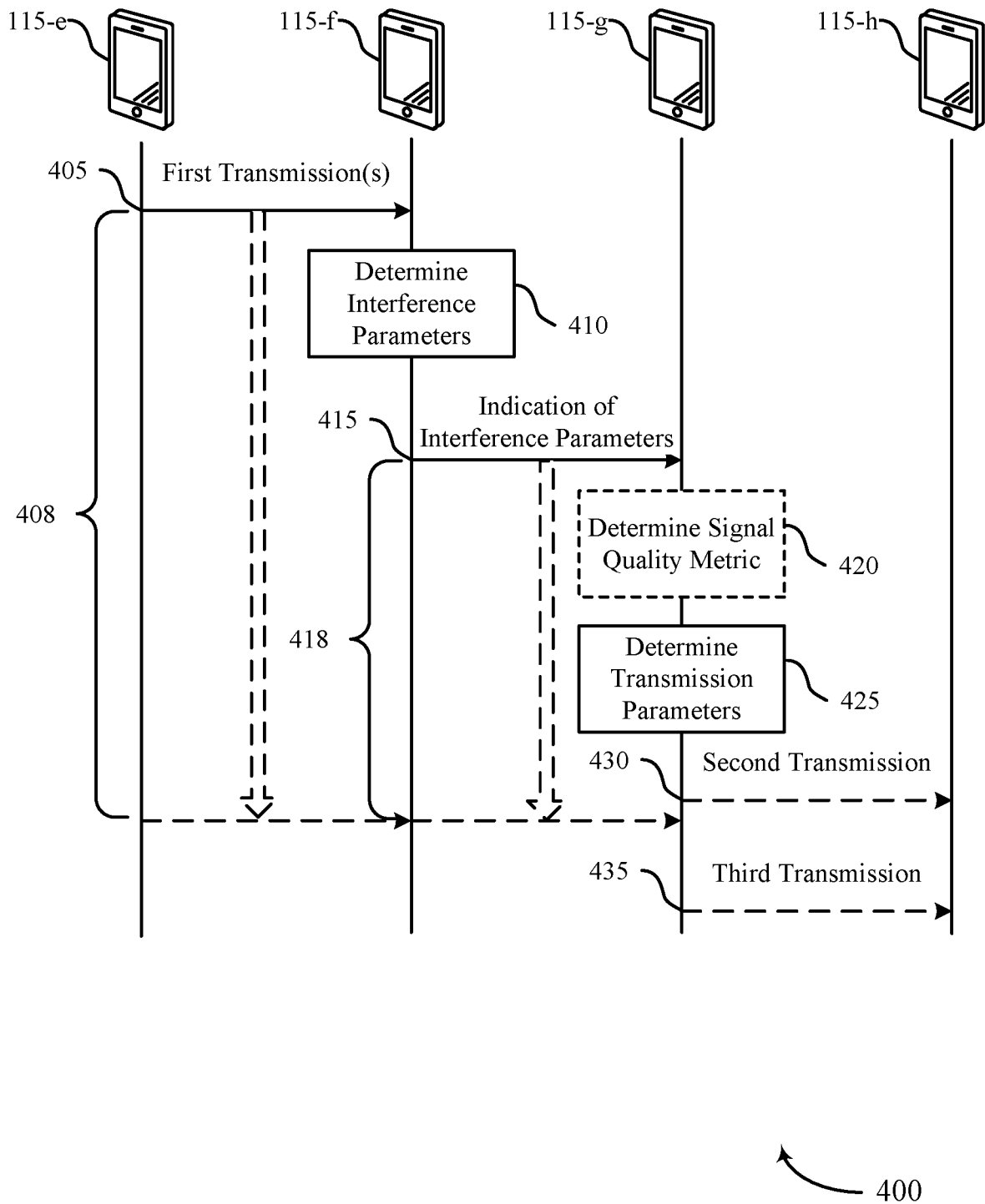
FIG. 4 illustrates an example of a process flow that supports interference power control for sidelink communications in accordance with aspects of the present disclosure.

FIG. 4 illustrates an example of a process flow 400 that supports interference power control for sidelink communications in accordance with aspects of the present disclosure. In some examples, the process flow 400 may be implemented by aspects of the wireless communications systems 100 and 200, as described with reference to FIGS. 1 and 2, respectively. The process flow 400 may include a UE 115-*e*, a UE 115-*f*, a UE 115-*g*, and a UE 115-*h*, which may be examples of the UEs 115 as described with reference to FIGS. 1 and 2. One or more of the UEs 115 may support full-duplex communications. In some cases, transmissions between the respective UEs 115 may be examples of sidelink communications. Alternative examples of the following may be implemented, where some steps are performed in a different order than described or are not performed at all. In some cases, steps may include additional features not mentioned below, or further steps may be added.

At 405, the UE 115-*e* may transmit to the UE 115-*f*, and the UE 115-*f* may receive from the UE 115-*e*, a first transmission (e.g., one or more first transmissions) using a first set of wireless resources. The UE 115-*e* may continue to transmit to the UE 115-*f* for a time duration 408.

At 410, the UE 115-*f* may determine one or more interference parameters for receiving the first transmission from the UE 115-*e*, which may be associated with a second transmission from the UE 115-*g* to the UE 115-*h* using a second set of wireless resources. In some cases, the UE 115-*f* may determine the maximum interference power based on a received signal power value and a target channel quality for communicating with the UE 115-*e*.

In some cases, the UE 115-*f* may determine a current interference level for communications with the UE 115-*e* and determine an interference power adjustment based on comparing the current interference level with an interference threshold. In some cases, the interference power adjustment may indicate a decrease for a maximum transmit power for the second transmission from the UE 115-*g* to the UE 115-*h* (e.g., based on a current interference level exceeding the interference threshold). In some cases, the interference power adjustment may indicate an increase for a maximum transmit power for the second transmission from the UE 115-*g* to the UE 115-*h* (e.g., based on the current interference level not exceeding the interference threshold).

At 415, the UE 115-*f* may transmit to the UE 115-*g*, and the UE 115-*g* may receive from the UE 115-*f*, an indication of the one or more interference parameters using a third set of resources. In some examples, the transmission of 415 may include a full-duplex operation using the third set of wireless resources that overlaps at least partially in the time domain with the first set of wireless resources (e.g., concurrently transmitting the indication of 415 and receiving the first transmission of 405). In other examples, the transmission of 415 may not include a full duplex operation (e.g., transmitting the indication of 415 during a gap of transmission or reception of the first transmission of 405, transmitting the indication of 415 before receiving at least a portion of the first transmission of 405, which may include interference parameters determined before at least a portion of the transmission of 405, or interference parameters that are not determined based on the first transmission of 405 or determined based on a different transmission). The UE 115-*f* may continue to transmit to the UE 115-*g* for a time duration 418 (e.g., corresponding to the time duration 408). In some cases, the UE 115-*f* may broadcast the indication of the one or more interference parameters.

In some cases, transmitting the indication of the one or more interference parameters may include transmitting the indication of the one or more interference parameters to the UE 115-*g*, and the second set of wireless resources may at least partially overlap the first set of wireless resources. In some cases, transmitting the indication of the one or more interference parameters may include periodically transmitting the indication of the one or more interference parameters in a plurality of transmission time intervals.

In some cases, transmitting the indication of the one or more interference parameters may include transmitting one or more reference signals. In some cases, the one or more reference signals for the one or more interference parameters may be associated with a same set of QCL information. In some cases, the one or more reference signals may include one or more synchronization signals. In some cases, the UE 115-*g* may receive reference signals to obtain the one or more interference parameters. In some cases, transmitting the indication of the one or more interference parameters may include transmitting a set of sequences corresponding to the one or more interference parameters.

In some cases, the one or more interference parameters may include a maximum interference power for receiving the first transmission from the UE 115-*e* using the first set of wireless resources. In some cases, the indication of the one or more interference parameters may be transmitted according to a transmit power parameter for transmissions to the UE 115-*g*. In some cases, the one or more interference parameters may include an interference power adjustment for receiving transmissions from the UE 115-*e*. In some cases, the indication of the one or more interference parameters may include an indication of a set of time-domain resources for the first set of wireless resources. In some cases, the indication of the one or more interference parameters may include an indication of a set of frequency-domain resources for the first set of wireless resources. In some cases, the set of frequency-domain resources for the first set of wireless resources may be indicated by a frequency location at which the indication is transmitted. In some cases, the third set of wireless resources at least partially overlaps in frequency with the first set of wireless resources. In some cases, third set of wireless resources may overlap for a full time duration of the third set of wireless resources with the first set of wireless resources.

In some examples, at 420, the UE 115-*g* may determine a signal quality metric based on the transmission parameters for communicating with the UE 115-*h*.

At 425, the UE 115-*g* may determine, based at least in part on the one or more interference parameters received from the UE 115-*f*, transmission parameters for communicating with a UE 115-*h* using a second set of wireless resources where the second set of wireless resources are at least partially overlapping (e.g., in the time domain, in the frequency domain) with the first set of wireless resources.

In some case, the UE 115-*g* may determine a maximum transmit power for communicating with the UE 115-*h* based on a signal quality metric and a maximum interference power (e.g., as determined at 420). In some examples, the UE 115-*g* may compare the signal quality metric with a signal quality threshold, and may determine whether transmission parameters are sufficient for communications with the UE 115-*h* based on the comparing. For example, the UE 115-*g* may determine that the transmission parameters are sufficient for further communications with the UE 115-*h* based on the signal quality metric exceeding the signal quality threshold.

In some examples, the UE 115-*g* may measure a path loss for signals received from the UE 115-*f*. In some cases, the UE 115-*g* may measure a receive power of transmissions received from the UE 115-*f* and determine the path loss based on the receive power and a transmit power parameter for transmissions from the UE 115-*f*.

In some cases, at 425, the UE 115-*g* may determine a maximum transmit power for communicating with the UE 115-*h* based on an interference power adjustment. In some cases, the UE 115-*g* may increase a maximum transmit power (e.g., of the UE 115-*g*) based on the interference power adjustment indicating an increase of the maximum interference power. In some cases, the UE 115-*g* may decrease a maximum transmit power based on the interference power adjustment indicating a decrease of the maximum interference power.

In some examples, at 430, the UE 115-*g* may transmit to the UE 115-*h*, and the UE 115-*h* may receive from the UE 115-*g*, a second transmission during a second set of time-domain resources, for example, according to a maximum transmit power (e.g., as determined at 425).

In some examples, at 435, the UE 115-*g* may transmit to the UE 115-*h*, and the UE 115-*h* may receive from the UE 115-*g*, a third transmission outside of the set of time-domain resources (e.g., after the time duration 408). In various examples, the third transmission may be transmitted by the UE 115-*g* according to the maximum transmit power determined at 425, or with a transmit power exceeding to the maximum transmit power determined at 425 (e.g., because the first transmission of 405 may have completed at the end of the time duration 408).

Figure 5:
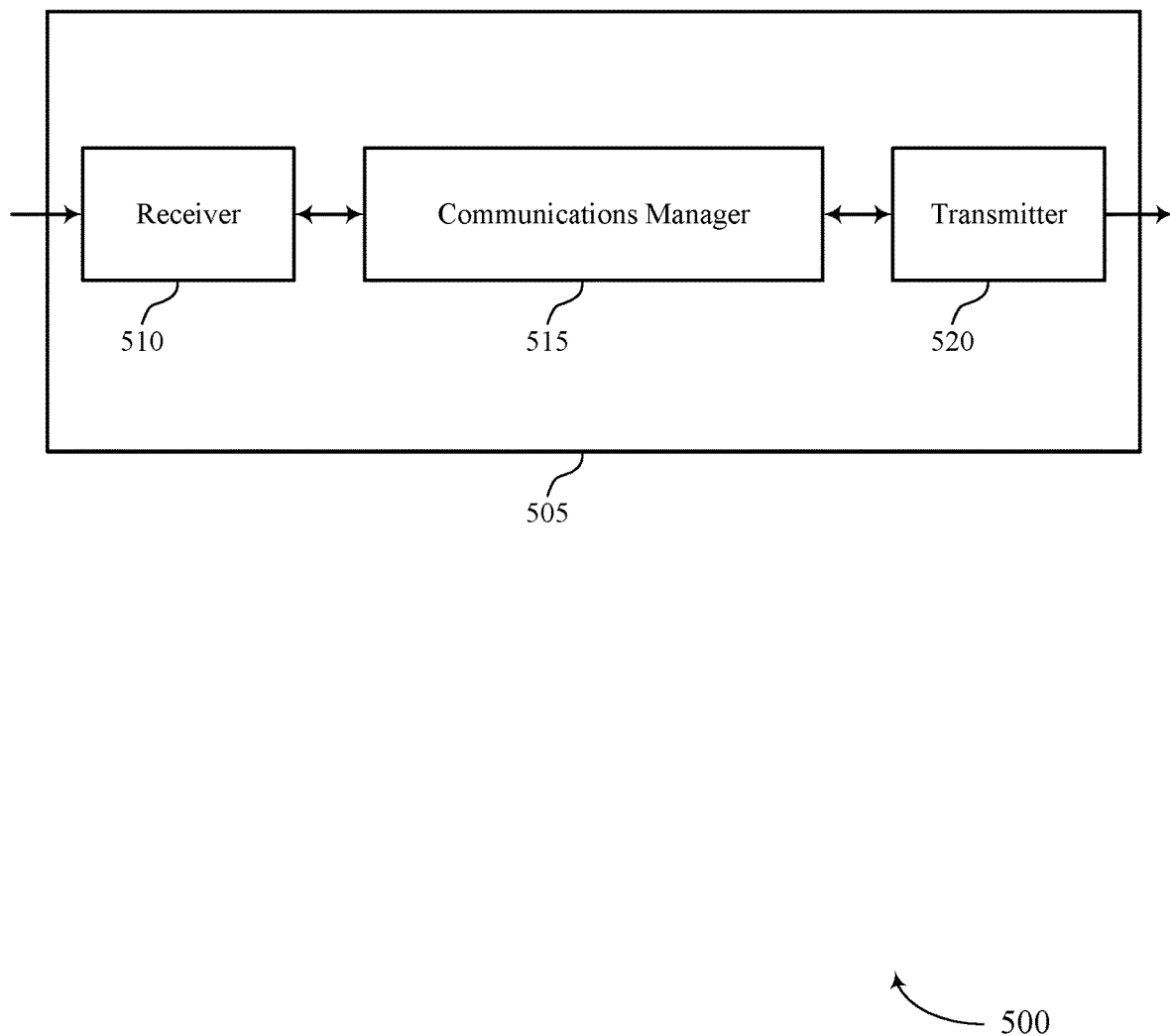
FIGS. 5 and 6 show block diagrams of devices that support interference power control for sidelink communications in accordance with aspects of the present disclosure.

FIG. 5 shows a block diagram 500 of a device 505 that supports interference power control for sidelink communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to interference power control for sidelink communications, etc.). Information may be passed on to other components of the device 505. The receiver 510 may be an example of aspects of the transceiver 820 described with reference to FIG. 8. The receiver 510 may utilize a single antenna or a set of antennas.

In some examples, the communications manager 515 may receive a first transmission from a first device at a second device using a first set of wireless resources, determine one or more interference parameters for (e.g., associated with) receiving the first transmission from the first device, the one or more interference parameters associated with a second transmission from a third device to a fourth device using a second set of wireless resources, and transmit an indication of the one or more interference parameters using a third set of wireless resources. In some examples, transmitting the indication of the one or more interference parameters may include transmitting in a full-duplex operation using the third set of wireless resources that overlaps at least partially in the time domain with the first set of wireless resources.

In some examples, the communications manager 515 may receive an indication of one or more interference parameters for (e.g., associated with) receiving a first transmission from a first device at a second device using a first set of wireless resources, the indication received at a third device from the second device over a third set of wireless resources, determine transmission parameters for communicating with a fourth device using a second set of wireless resources based on the one or more interference parameters received from the second device, the second set of wireless resources at least partially overlapping the first set of wireless resources, and communicate with the fourth device using the second set of wireless resources based on the transmission parameters.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 515 may be an example of aspects of the communications manager 810 described herein.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
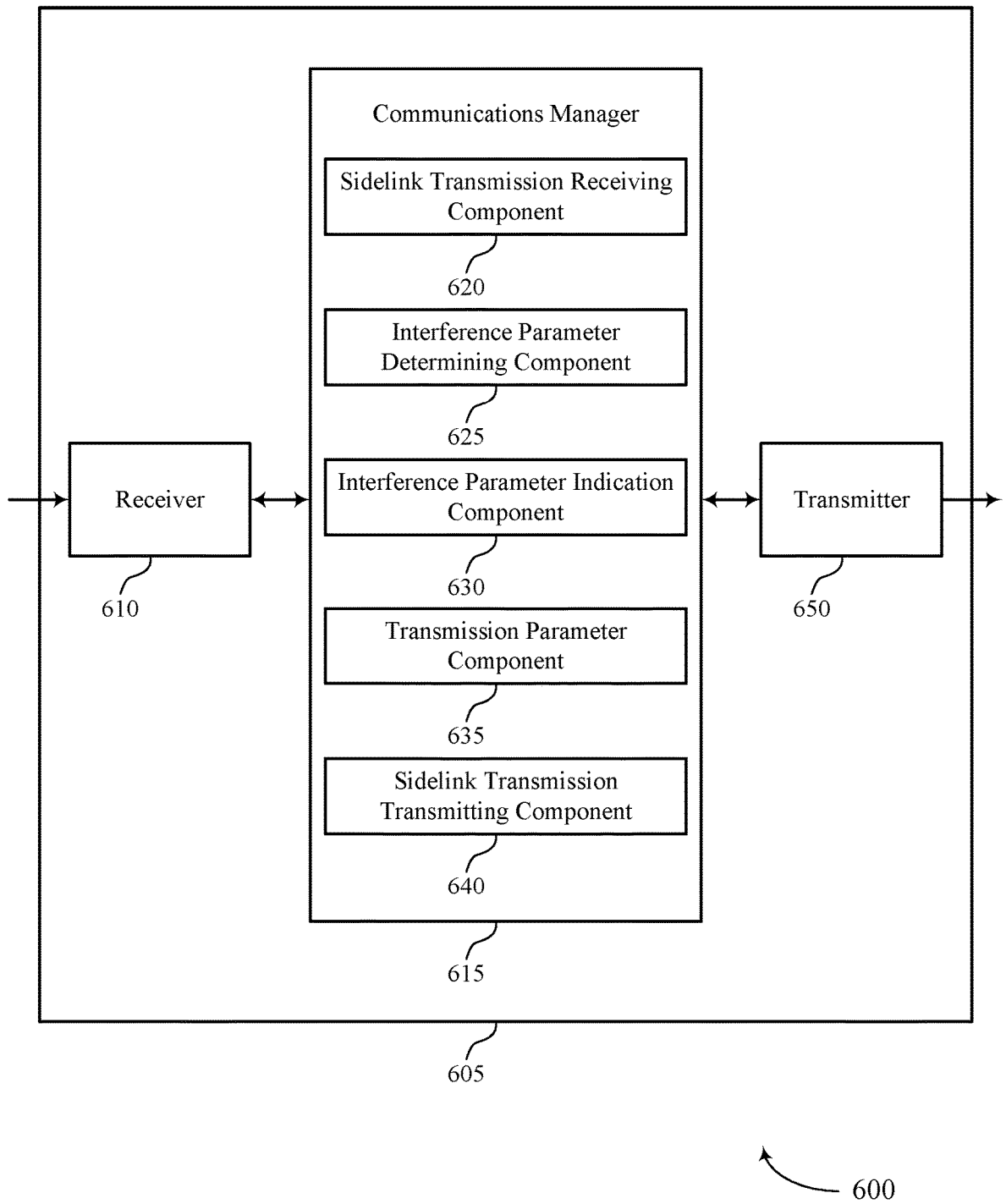

FIG. 6 shows a block diagram 600 of a device 605 that supports interference power control for sidelink communications in accordance with aspects of the present disclosure. The device 605 may be an example of aspects of a device 505, or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to interference power control for sidelink communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink transmission receiving component 620, an interference parameter determining component 625, an interference parameter indication component 630, a transmission parameter component 635, and a sidelink transmission transmitting component 640. The communications manager 615 may be an example of aspects of the communications manager 810 described herein.

In some examples, the sidelink transmission receiving component 620 may receive a first transmission from a first device at a second device using a first set of wireless resources. The interference parameter determining component 625 may determine one or more interference parameters for receiving the first transmission from the first device, the one or more interference parameters associated with a second transmission from a third device to a fourth device using a second set of wireless resources. The interference parameter indication component 630 may transmit an indication of the one or more interference parameters using a third set of wireless resources. In some examples, the interference parameter indication component 630 may be configured to transmit the indication of the one or more interference parameters in a full-duplex operation using the third set of wireless resources that overlaps at least partially in the time domain with the first set of wireless resources.

In some examples, the interference parameter indication component 630 may receive an indication of one or more interference parameters for receiving a first transmission from a first device at a second device using a first set of wireless resources, the indication received at a third device from the second device over a third set of wireless resources. The transmission parameter component 635 may determine transmission parameters for communicating with a fourth device using a second set of wireless resources based on the one or more interference parameters received from the second device, the second set of wireless resources at least partially overlapping the first set of wireless resources. The sidelink transmission transmitting component 640 may communicate with the fourth device using the second set of wireless resources based on the transmission parameters.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
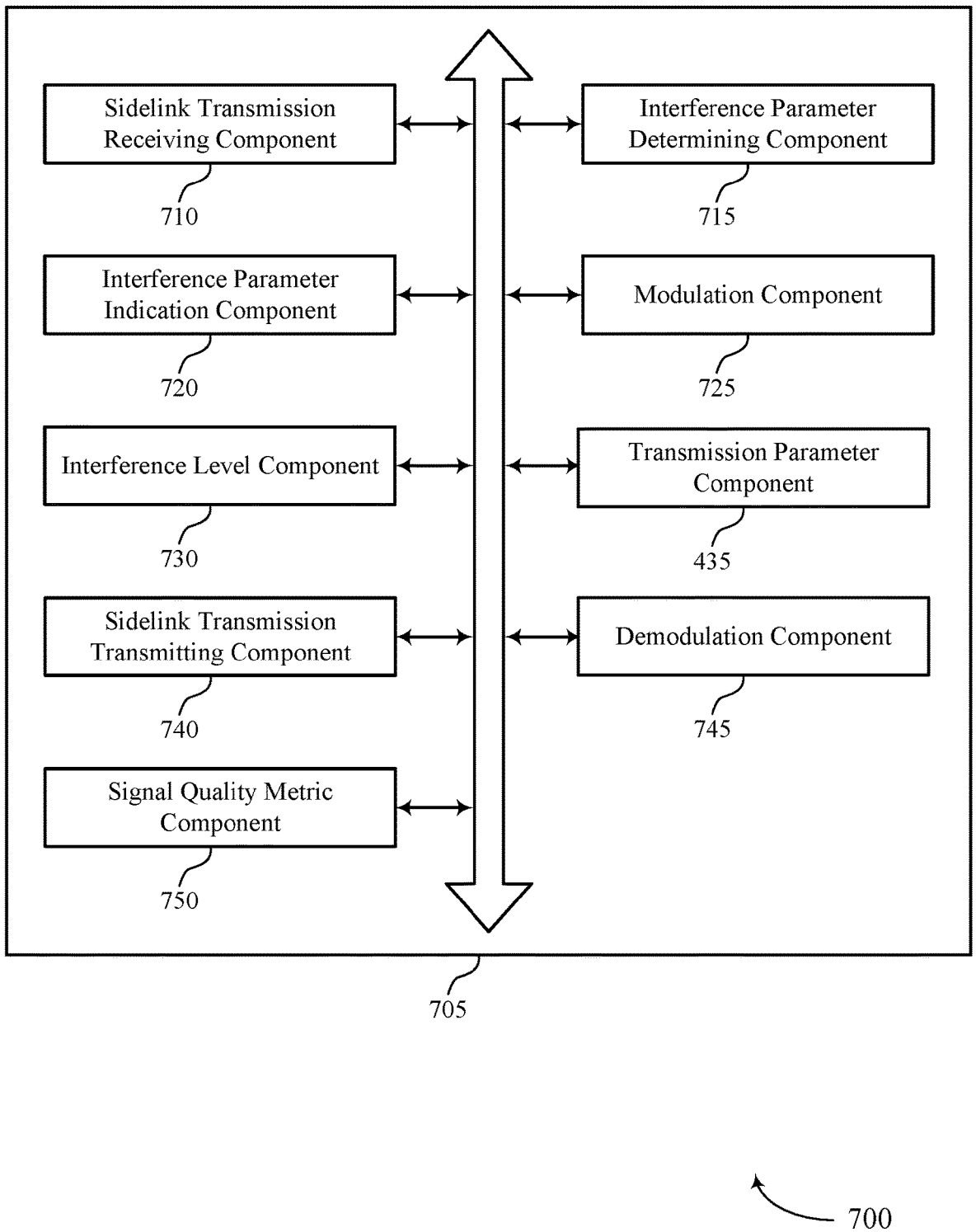
FIG. 7 shows a block diagram of a communications manager that supports interference power control for sidelink communications in accordance with aspects of the present disclosure.

FIG. 7 shows a block diagram 700 of a communications manager 705 that supports interference power control for sidelink communications in accordance with aspects of the present disclosure. The communications manager 705 may be an example of aspects of a communications manager 515, a communications manager 615, or a communications manager 810 described herein. The communications manager 705 may include a sidelink transmission receiving component 710, an interference parameter determining component 715, an interference parameter indication component 720, a modulation component 725, an interference level component 730, a transmission parameter component 735, a sidelink transmission transmitting component 740, a demodulation component 745, and a signal quality metric component 750. Each of these modules may communicate, directly or indirectly, with one another (e.g., via one or more buses).

The sidelink transmission receiving component 710 may receive a first transmission from a first device at a second device using a first set of wireless resources. In some examples, the communications between the first device and the second device include sidelink communications.

The interference parameter determining component 715 may determine one or more interference parameters for receiving the first transmission from the first device, the one or more interference parameters associated with a second transmission from a third device to a fourth device using a second set of wireless resources.

In some cases, the one or more interference parameters include a maximum interference power for receiving the first transmission from the first device using the first set of wireless resources. In some examples, the interference parameter determining component 715 may determine a maximum interference power based on a received signal power value and a target channel quality for communicating with the first device.

In some cases, the one or more interference parameters include an interference power adjustment for receiving transmissions from the first device. In some examples, the interference parameter determining component 715 may determine an interference power adjustment based on comparing a current interference level with an interference threshold. In some cases, the interference power adjustment indicates a decrease for a maximum transmit power for the second transmission from the third device to the fourth device, the interference power adjustment based on the current interference level exceeding the interference threshold. In some cases, the interference power adjustment indicates an increase for a maximum transmit power for the second transmission from the third device to the fourth device, the interference power adjustment based on the current interference level not exceeding the interference threshold.

The interference parameter indication component 720 may transmit an indication of the one or more interference parameters using a third set of wireless resources. In some examples, the interference parameter indication component 720 may transmit the indication of the one or more interference parameters in a full-duplex operation using the third set of wireless resources that overlaps at least partially in the time domain with the first set of wireless resources. In some cases, the third set of wireless resources at least partially overlaps in frequency with the first set of wireless resources. In some cases, the third set of wireless resources overlaps for a full time duration of the third set of wireless resources with the first set of wireless resources.

In some examples, the interference parameter indication component 720 may transmit the indication of the one or more interference parameters to the third device, and the second set of wireless resources may at least partially overlap the first set of wireless resources.

In some examples, the interference parameter indication component 720 may broadcast the indication of the one or more interference parameters. In some examples, the interference parameter indication component 720 may periodically transmit the indication of the one or more interference parameters in a set of transmission time intervals.

In some examples, to transmit the indication of the one or more interference parameters, the interference parameter indication component 720 may transmit one or more modulated reference signals. In some cases, the one or more reference signals may include one or more synchronization signals.

In some examples, to transmit the indication of the one or more interference parameters, the interference parameter indication component 720 may transmit a set of sequences corresponding to the one or more interference parameters.

In some examples, transmitting the indication of the one or more interference parameters to the third device may include sidelink communications.

In some cases, the indication of the one or more interference parameters may be transmitted according to a transmit power parameter for transmissions to the third device.

In some cases, the indication of the one or more interference parameters may include an indication of a set of time-domain resources for the first set of wireless resources.

In some cases, the indication of the one or more interference parameters may include an indication of a set of frequency-domain resources for the first set of wireless resources. In some cases, the set of frequency-domain resources for the first set of wireless resources is indicated by a frequency location at which the indication is transmitted.

In some cases, the transmission from the third device to the fourth device includes sidelink communications.

In some examples, the interference parameter indication component 720 may receive an indication of one or more interference parameters for receiving a first transmission from a first device at a second device using a first set of wireless resources, the indication received at a third device from the second device over a third set of wireless resources.

In some examples, the interference parameter indication component 720 may periodically receive the indication of the one or more interference parameters in a set of transmission time intervals.

In some examples, to receive the indication of the one or more interference parameters, the interference parameter indication component 720 may receive reference signals for the one or more interference parameters. In some cases, the one or more reference signals include one or more synchronization signals.

In some examples, to receive the indication of the one or more interference parameters, the interference parameter indication component 720 may receive a set of sequences corresponding to the one or more interference parameters.

In some examples, receiving the indication of one or more interference parameters includes sidelink communications. In some cases, the second device receiving the first transmission from the first device includes sidelink communications.

In some cases, the third set of wireless resources for receiving the indication of the one or more interference parameters at least partially overlaps in the time domain with the first set of wireless resources for the second device to receive the first transmission from the first device.

In some cases, the one or more interference parameters include a maximum interference power for the second device to receive the first transmission from the first device using the first set of wireless resources. In some cases, the one or more interference parameters include an interference power adjustment to a maximum interference power for the second device to receive transmissions from the first device.

In some cases, the indication of the one or more interference parameters include an indication of a set of time-domain resources for the first set of wireless resources. In some cases, the indication of the one or more interference parameters include an indication of a set of frequency-domain resources for the first set of wireless resources. In some cases, the set of frequency-domain resources for the first set of wireless resources is indicated by a frequency location at which the indication of the set of frequency-domain resources is received.

The transmission parameter component 735 may determine transmission parameters for communicating with a fourth device using a second set of wireless resources based on the one or more interference parameters received from the second device. In some examples, the second set of wireless resources may at least partially overlap the first set of wireless resources.

In some examples, the transmission parameter component 735 may determine a maximum transmit power for communicating with the fourth device based on a signal quality metric and the maximum interference power.

In some examples, the transmission parameter component 735 may determine a maximum transmit power for communicating with the fourth device based on an interference power adjustment. In some examples, the transmission parameter component 735 may increase the maximum transmit power based on the interference power adjustment indicating an increase of the maximum interference power. In some examples, the transmission parameter component 735 may decrease the maximum transmit power based on the interference power adjustment indicating a decrease of the maximum interference power.

In some examples, the transmission parameter component 735 may determine one or more additional sets of resources for communicating with the fourth device based on determining that transmission parameters are not sufficient.

In some examples, sidelink transmission transmitting component 740 may communicate with the fourth device using the second set of wireless resources based on the transmission parameters. In some examples, the sidelink transmission transmitting component 740 may transmit one or more transmissions to the fourth device using the second set of wireless resources. In some examples, the sidelink transmission transmitting component 740 may transmit a second transmission to the fourth device during the set of time-domain resources according to a maximum transmit power. In some examples, communicating with the fourth device includes sidelink communications.

In some examples, the sidelink transmission transmitting component 740 may transmit a third transmission to the fourth device outside of the set of time-domain resources according to the maximum transmit power. In some examples, the sidelink transmission transmitting component 740 may transmit a third transmission to the fourth device outside of the set of time-domain resources using a transmit power exceeding the maximum transmit power.

In some examples, the sidelink transmission transmitting component 740 may perform communications with the fourth device based on determining that transmission parameters are sufficient.

In some examples, the sidelink transmission transmitting component 740 may communicate with the fourth device during a configured set of time-domain resources according to a maximum transmit power based on the transmission parameters.

In some examples, the sidelink transmission transmitting component 740 may communicate with the first device outside of the configured set of time-domain resources according to the maximum transmit power. In some examples, the sidelink transmission transmitting component 740 may communicate with the first device outside of the configured set of time-domain resources using a transmit power exceeding the maximum transmit power.

In some examples, communicating with the fourth device using the second set of wireless resources may include the sidelink transmission transmitting component 740 performing a full-duplex operation.

In some examples, to transmit an indication of one or more interference parameters, the modulation component 725 may transmit one or more modulated interference parameters.

In some examples, interference level component 730 may determine a current interference level for communications with the first device.

In some examples, to receive an indication of one or more interference parameters, the demodulation component 745 may demodulate reference signals to obtain the one or more interference parameters.

In some examples, the signal quality metric component 750 may determine a signal quality metric for communicating with the second device. In some examples, the signal quality metric component 750 may measure a path loss for signals received from the second device. In some examples, the signal quality metric component 750 may measure a receive power of transmissions received from the second device. In some examples, the signal quality metric component 750 may determine the path loss based on the receive power and a transmit power parameter for transmissions from the second device.

In some examples, the signal quality metric component 750 may determine a signal quality metric based on the transmission parameters for communicating with the fourth device. In some examples, the signal quality metric component 750 may compare the signal quality metric with a signal quality threshold. In some examples, the signal quality metric component 750 may determine whether the transmission parameters are sufficient for further communications with the fourth device based on the comparing.

In some examples, the signal quality metric component 750 may determine that transmission parameters are sufficient for communications with the fourth device based on a signal quality metric exceeding a signal quality threshold. In some examples, the signal quality metric component 750 may determine that transmission parameters are not sufficient for communications with the fourth device based on the signal quality metric not exceeding a signal quality threshold.

Figure 8:
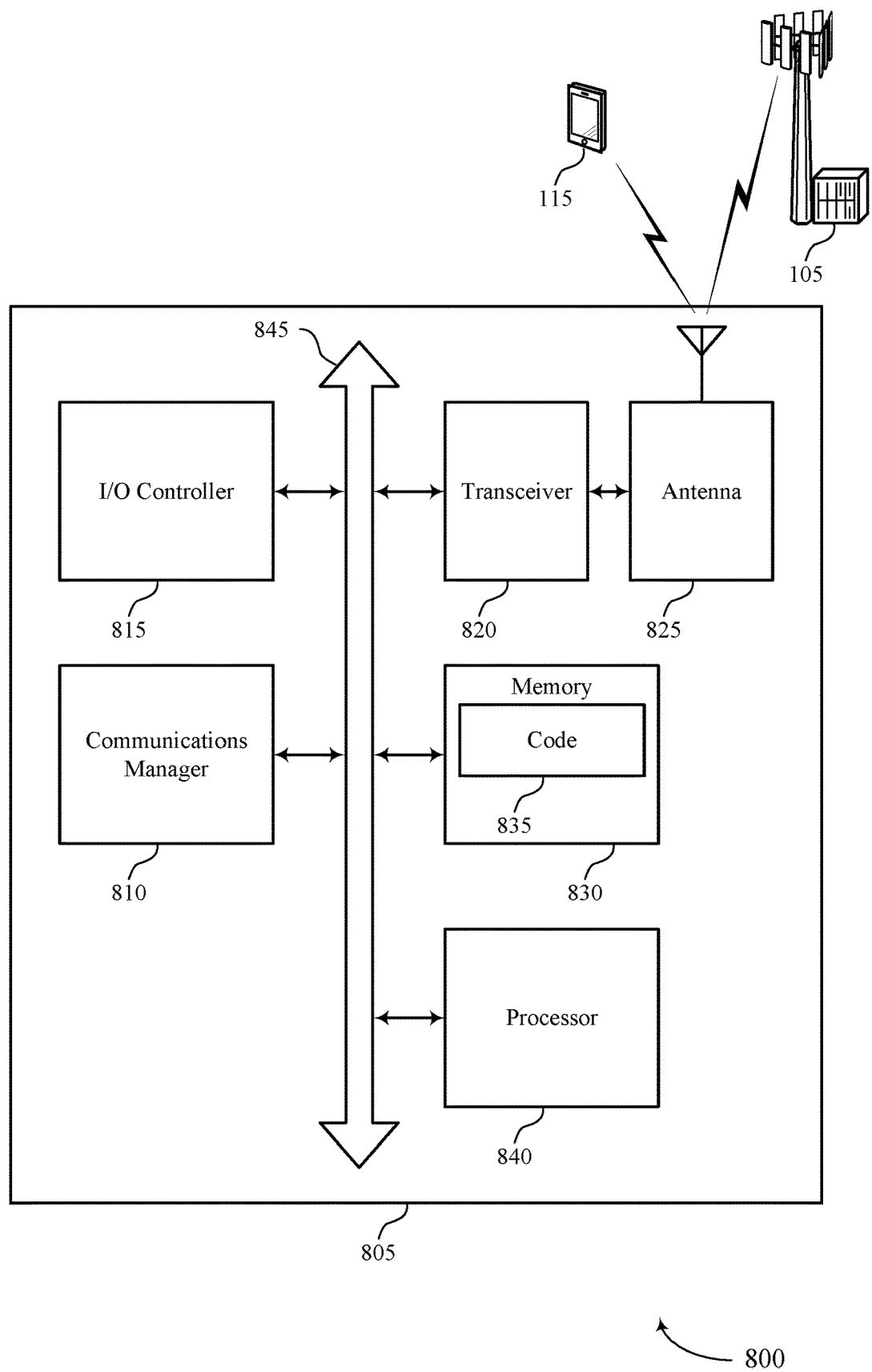
FIG. 8 shows a diagram of a system including a device that supports interference power control for sidelink communications in accordance with aspects of the present disclosure.

FIG. 8 shows a diagram of a system 800 including a device 805 that supports interference power control for sidelink communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some examples, the communications manager 810 may receive a first transmission from a first device at a second device using a first set of wireless resources, determine one or more interference parameters for receiving the first transmission from the first device, the one or more interference parameters associated with a second transmission from a third device to a fourth device using a second set of wireless resources, and transmit an indication of the one or more interference parameters using a third set of wireless resources. In some examples, transmitting the indication of the one or more interference parameters may include a transmission in a full-duplex operation using the third set of wireless resources that overlaps at least partially in the time domain with the first set of wireless resources.

In some examples, communications manager 810 may receive an indication of one or more interference parameters for receiving a first transmission from a first device at a second device using a first set of wireless resources, the indication received at a third device from the second device over a third set of wireless resources, determine transmission parameters for communicating with a fourth device using a second set of wireless resources based on the one or more interference parameters received from the second device, the second set of wireless resources at least partially overlapping the first set of wireless resources, and communicate with the fourth device using the second set of wireless resources based on the transmission parameters.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting interference power control for sidelink communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
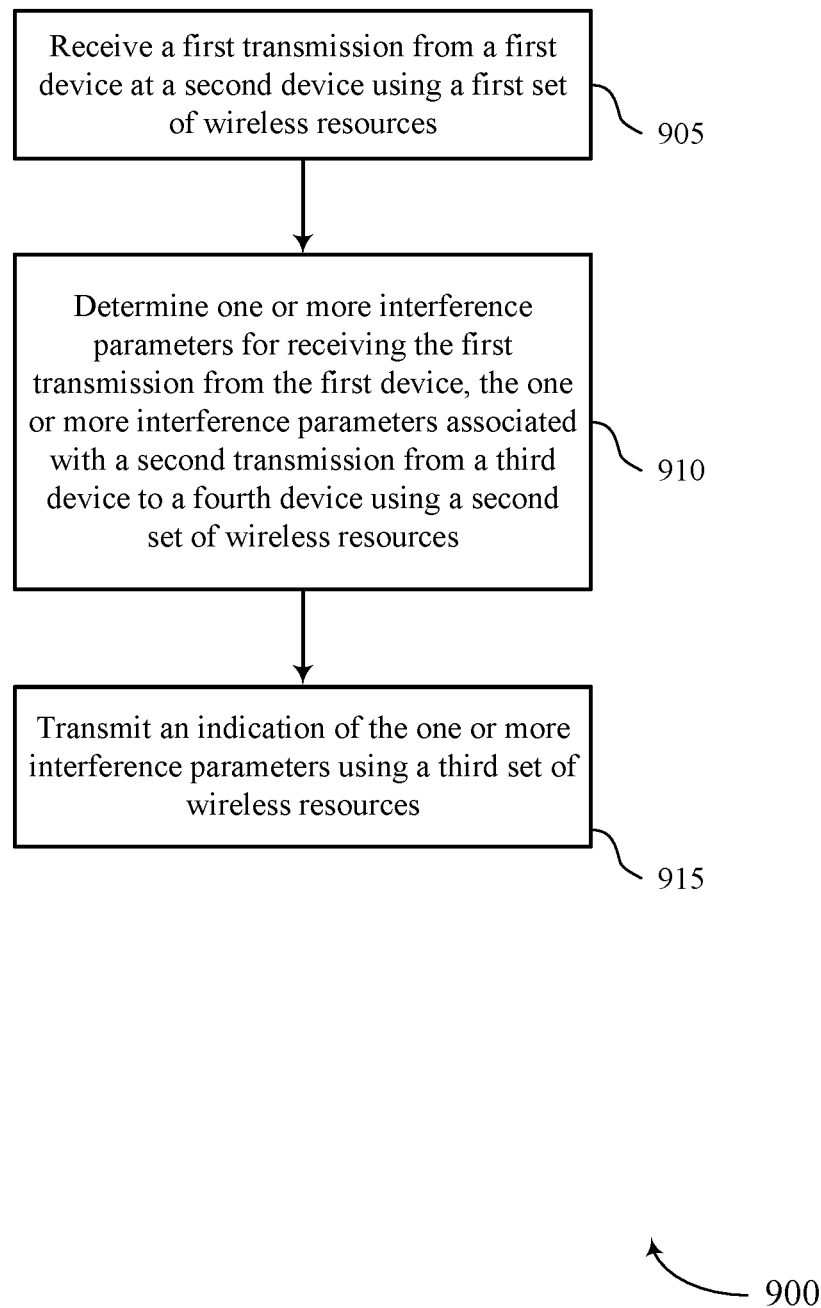
FIGS. 9 and 10 show flowcharts illustrating methods that support interference power control for sidelink communications in accordance with aspects of the present disclosure.

FIG. 9 shows a flowchart illustrating a method 900 that supports interference power control for sidelink communications in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive a first transmission from a first device at a second device using a first set of wireless resources. The operations of 905 may be performed according to the methods described herein. In some examples, aspects of the operations of 905 may be performed by a sidelink transmission receiving component as described with reference to FIGS. 5 through 8.

At 910, the UE may determine one or more interference parameters for receiving the first transmission from the first device, the one or more interference parameters associated with a second transmission from a third device to a fourth device using a second set of wireless resources. The operations of 910 may be performed according to the methods described herein. In some examples, aspects of the operations of 910 may be performed by an interference parameter determining component as described with reference to FIGS. 5 through 8.

At 915, the UE may transmit an indication of the one or more interference parameters using a third set of wireless resources. In some examples, the transmitting of 915 may include a transmission in a full-duplex operation using the third set of wireless resources that overlaps at least partially in the time domain with the first set of wireless resources.

The operations of 915 may be performed according to the methods described herein. In some examples, aspects of the operations of 915 may be performed by an interference parameter indication component as described with reference to FIGS. 5 through 8.

Figure 10:
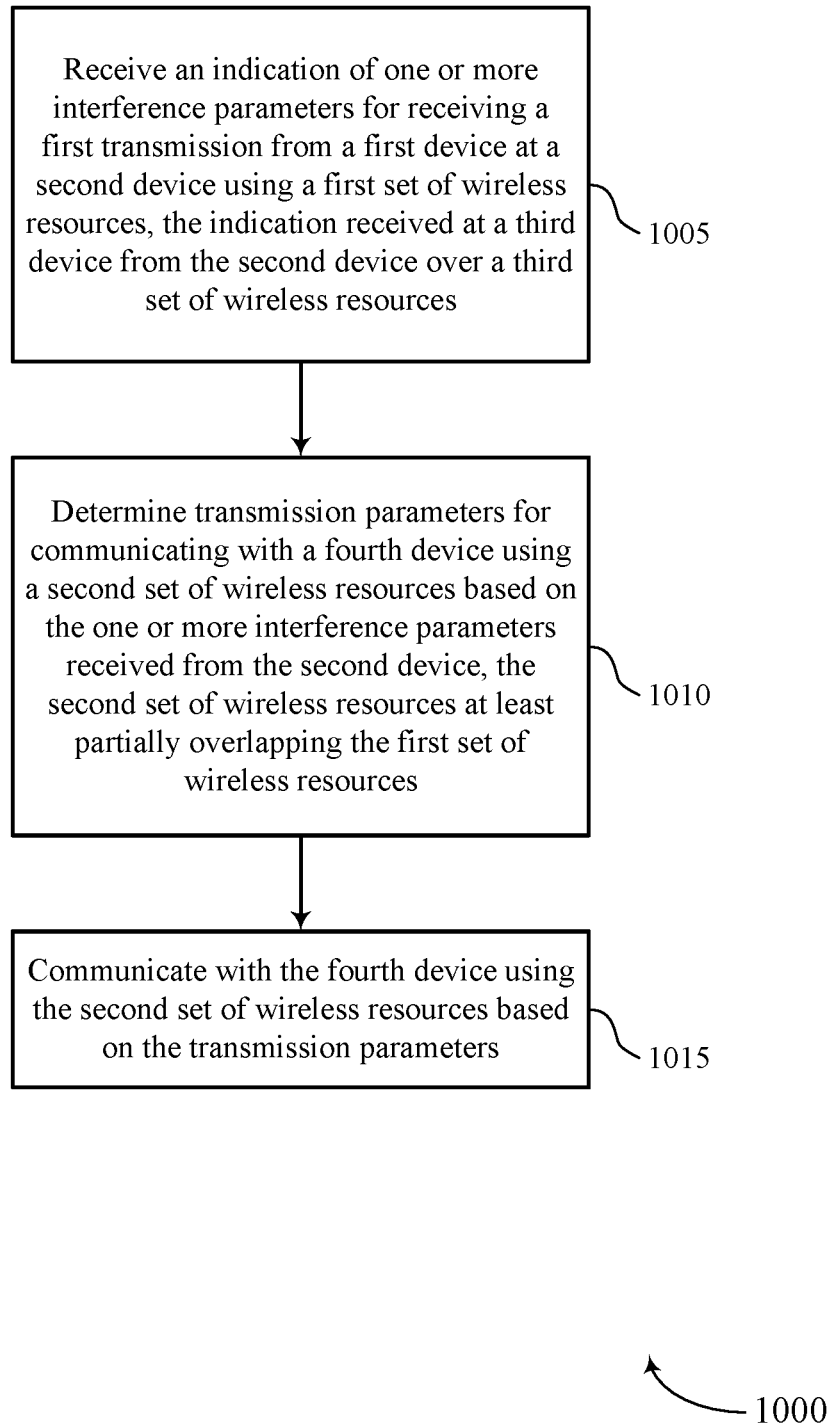

FIG. 10 shows a flowchart illustrating a method 1000 that supports interference power control for sidelink communications in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive an indication of one or more interference parameters for receiving a first transmission from a first device at a second device using a first set of wireless resources, the indication received at a third device from the second device over a third set of wireless resources. The operations of 1005 may be performed according to the methods described herein. In some examples, aspects of the operations of 1005 may be performed by an interference parameter indication component as described with reference to FIGS. 5 through 8.

At 1010, the UE may determine transmission parameters for communicating with a fourth device using a second set of wireless resources based on the one or more interference parameters received from the second device, the second set of wireless resources at least partially overlapping the first set of wireless resources. The operations of 1010 may be performed according to the methods described herein. In some examples, aspects of the operations of 1010 may be performed by a transmission parameter component as described with reference to FIGS. 5 through 8.

At 1015, the UE may communicate with the fourth device using the second set of wireless resources based on the transmission parameters. The operations of 1015 may be performed according to the methods described herein. In some examples, aspects of the operations of 1015 may be performed by a sidelink transmission transmitting component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a first transmission from a first device at a second device using a first set of wireless resources;
determining one or more interference parameters associated with reception from the first device, the one or more interference parameters including a parameter for an allowable interference power associated with transmission from a third device using a second set of wireless resources; and
transmitting an indication of the one or more interference parameters using a third set of wireless resources.

2. The method of claim 1, wherein transmitting the indication of the one or more interference parameters comprises:
transmitting the indication of the one or more interference parameters in a full-duplex operation using the third set of wireless resources that at least partially overlaps in the time domain with the first set of wireless resources.

3. The method of claim 1, further comprising:
broadcasting the indication of the one or more interference parameters.

4. The method of claim 1, wherein transmitting the indication of the one or more interference parameters comprises:
transmitting the indication of the one or more interference parameters to the third device, wherein the second set of wireless resources at least partially overlaps the first set of wireless resources.

5. The method of claim 1, wherein transmitting the indication of the one or more interference parameters comprises:
periodically transmitting the indication of the one or more interference parameters in a plurality of transmission time intervals.

6. The method of claim 1, wherein transmitting the indication of the one or more interference parameters comprises:
transmitting one or more reference signals.

7. The method of claim 6, wherein the one or more reference signals comprise one or more synchronization signals.

8. The method of claim 1, wherein transmitting the indication of the one or more interference parameters comprises:
transmitting a set of sequences corresponding to the one or more interference parameters.

9. The method of claim 1, further comprising:
determining the allowable interference power based at least in part on a received signal power value and a target channel quality for communicating with the first device.

10. The method of claim 1, wherein the indication of the one or more interference parameters are transmitted according to a transmit power parameter for transmissions to the third device.

11. The method of claim 1, wherein the one or more interference parameters comprise an interference power adjustment for receiving transmissions from the first device.

12. The method of claim 11, further comprising:
determining a current interference level for communications with the first device; and
determining the interference power adjustment based at least in part on comparing the current interference level with an interference threshold.

13. The method of claim 12, wherein the interference power adjustment indicates a decrease for a maximum transmit power for the transmission from the third device, the interference power adjustment based at least in part on the current interference level exceeding the interference threshold.

14. The method of claim 12, wherein the interference power adjustment indicates an increase for a maximum transmit power for the transmission from the third device, the interference power adjustment based at least in part on the current interference level not exceeding the interference threshold.

15. The method of claim 1, wherein the indication of the one or more interference parameters comprises an indication of a set of time-domain resources for the first set of wireless resources.

16. The method of claim 1, wherein the indication of the one or more interference parameters comprises an indication of a set of frequency-domain resources for the first set of wireless resources.

17. The method of claim 16, wherein the set of frequency-domain resources for the first set of wireless resources is indicated by a frequency location at which the indication is transmitted.

18. The method of claim 1, wherein the third set of wireless resources at least partially overlaps in frequency with the first set of wireless resources.

19. The method of claim 1, wherein the third set of wireless resources overlaps for a full time duration of the third set of wireless resources with the first set of wireless resources.

20. The method of claim 1, wherein communications between the first device and the second device comprise sidelink communications.

21. The method of claim 1, wherein transmitting the indication of the one or more interference parameters to the third device comprises sidelink communications.

22. The method of claim 1, wherein the transmission from the third device comprises sidelink communications.

23. A method for wireless communication, comprising:
receiving, from a second device, an indication of one or more interference parameters associated with reception at the second device using a first set of wireless resources, the indication received at a third device using a third set of wireless resources;
determining transmission parameters for communicating via a second set of wireless resources based at least in part on the one or more interference parameters, the one or more interference parameters including a parameter for an allowable interference power associated with transmission from the third device using the second set of wireless resources that at least partially overlap the first set of wireless resources; and
communicating using the second set of wireless resources based at least in part on the transmission parameters.

24. The method of claim 23, wherein receiving the indication of the one or more interference parameters comprises:
periodically receiving the indication of the one or more interference parameters in a plurality of transmission time intervals.

25. The method of claim 23, wherein communicating using the second set of wireless resources comprises:
transmitting one or more transmissions using the second set of wireless resources.

26. The method of claim 23, wherein the third set of wireless resources for receiving the indication of the one or more interference parameters at least partially overlaps in the time domain with the first set of wireless resources.

27. The method of claim 23, wherein receiving the indication of the one or more interference parameters comprises:
receiving one or more reference signals for the one or more interference parameters.

28. The method of claim 27, wherein the one or more reference signals comprise one or more synchronization signals.

29. The method of claim 23, wherein receiving the indication of the one or more interference parameters comprises:
receiving a set of sequences corresponding to the one or more interference parameters.

30. The method of claim 24, further comprising:
determining a signal quality metric for communicating with the second device; and
determining a maximum transmit power based at least in part on the signal quality metric and the allowable interference power.

31. The method of claim 30, wherein determining the signal quality metric comprises:

measuring a path loss for signals received from the second device.

32. The method of claim 31, wherein measuring the path loss comprises:
measuring a receive power of transmissions received from the second device; and
determining the path loss based at least in part on the receive power and a transmit power parameter for transmissions from the second device.

33. The method of claim 23, wherein the one or more interference parameters comprise an interference power adjustment to the allowable interference power.

34. The method of claim 33, further comprising:
determining a maximum transmit power for transmissions by the third device based at least in part on the interference power adjustment.

35. The method of claim 34, wherein determining the maximum transmit power comprises:
increasing the maximum transmit power based at least in part on the interference power adjustment indicating an increase of the allowable interference power.

36. The method of claim 34, wherein determining the maximum transmit power for the third device comprises:
decreasing the maximum transmit power based at least in part on the interference power adjustment indicating a decrease of the allowable interference power.

37. The method of claim 23, wherein the indication of the one or more interference parameters comprises an indication of a set of time-domain resources for the first set of wireless resources.

38. The method of claim 23, wherein the indication of the one or more interference parameters comprises an indication of a set of frequency-domain resources for the first set of wireless resources.

39. The method of claim 38, wherein the set of frequency-domain resources for the first set of wireless resources is indicated by a frequency location at which the indication of the set of frequency-domain resources is received.

40. The method of claim 23, further comprising:
transmitting one or more first transmissions using a set of time-domain resources according to a maximum transmit power; and
transmitting one or more second transmissions outside of the set of time-domain resources according to the maximum transmit power.

41. The method of claim 23, further comprising:
transmitting one or more first transmissions using a set of time-domain resources according to a maximum transmit power; and
transmitting one or more second transmissions outside of the set of time-domain resources using a transmit power exceeding the maximum transmit power.

42. The method of claim 23, further comprising:
determining a signal quality metric based at least in part on the transmission parameters;
comparing the signal quality metric with a signal quality threshold; and
determining whether the transmission parameters are sufficient for further communications based at least in part on the comparing.

43. The method of claim 42, further comprising:
determining that the transmission parameters are sufficient for further communications based at least in part on the signal quality metric exceeding the signal quality threshold; and
performing the further communications based at least in part on determining that the transmission parameters are sufficient.

44. The method of claim 42, further comprising:
determining that the transmission parameters are not sufficient for further communications based at least in part on the signal quality metric failing to exceed the signal quality threshold; and
determining one or more additional sets of resources for communications based at least in part on determining that the transmission parameters are insufficient.

45. The method of claim 23, further comprising:
communicating during a configured set of time-domain resources according to a maximum transmit power based at least in part on the transmission parameters; and
communicating outside of the configured set of time-domain resources according to the maximum transmit power.

46. The method of claim 23, further comprising:
communicating during a configured set of time-domain resources according to a maximum transmit power based at least in part on the transmission parameters; and
communicating outside of the configured set of time-domain resources using a transmit power exceeding the maximum transmit power.

47. The method of claim 23, wherein the reception at the second device is associated with sidelink communications.

48. The method of claim 23, wherein receiving the indication of the one or more interference parameters comprises sidelink communications.

49. The method of claim 23, wherein communicating using the second set of wireless resources comprises sidelink communications.

50. The method of claim 23, wherein receiving the indication of the one or more interference parameters using the third set of wireless resources and communicating using the second set of wireless resources comprises a full-duplex operation.

51. An apparatus for wireless communication, comprising:
one or more processors,
one or more memories coupled with the one or more processors; and
instructions stored in the one or more memories and executable by the one or more processors to cause the apparatus to:
receive a first transmission from a first device at a second device using a first set of wireless resources;
determine one or more interference parameters associated with reception from the first device, the one or more interference parameters including a parameter for an allowable interference power associated with transmission from a third device using a second set of wireless resources; and
transmit an indication of the one or more interference parameters in a using a third set of wireless resources.

52. An apparatus for wireless communication, comprising:
one or more processors,
one or more memories coupled with the one or more processors; and
instructions stored in the one or more memories and executable by the one or more processors to cause the apparatus to:

receive, from a second device, an indication of one or more interference parameters associated with receptions at the second device from a first device using a first set of wireless resources, the indication received at a third device via a third set of wireless resources;
determine transmission parameters for communicating via a second set of wireless resources based at least in part on the one or more interference parameters, the one or more interference parameters including a parameter for an allowable interference power associated with transmission from the third device using the second set of wireless resources that at least partially overlap the first set of wireless resources; and
communicate using the second set of wireless resources based at least in part on the transmission parameters.

* * * * *